United States Patent
Collins

(10) Patent No.: US 7,028,025 B2
(45) Date of Patent: Apr. 11, 2006

(54) METHOD AND SYSTEM FOR EFFICIENTLY REDUCING GRAPHICAL DISPLAY DATA FOR TRANSMISSION OVER A LOW BANDWIDTH TRANSPORT PROTOCOL MECHANISM

(75) Inventor: Henry Collins, High Wycombe (GB)

(73) Assignee: Citrix Sytems, Inc., Ft. Lauderdale, FL (US)

( * ) Notice: Subject to any disclaimer, the term of this patent is extended or adjusted under 35 U.S.C. 154(b) by 566 days.

(21) Appl. No.: 09/866,531

(22) Filed: May 25, 2001

(65) Prior Publication Data

US 2002/0073061 A1 Jun. 13, 2002

Related U.S. Application Data

(60) Provisional application No. 60/207,532, filed on May 26, 2000, and provisional application No. 60/225,217, filed on Aug. 14, 2000.

(51) Int. Cl.
*G06F 17/30* (2006.01)
*G06F 17/00* (2006.01)

(52) U.S. Cl. .............................. 707/3; 707/2; 707/104.1

(58) Field of Classification Search ............. 707/3, 707/2, 10, 101, 1–6, 104.1; 711/118; 709/247, 709/217; 382/232
See application file for complete search history.

(56) References Cited

U.S. PATENT DOCUMENTS

| | | | | |
|---|---|---|---|---|
| 3,596,257 A | 7/1971 | Patel et al. | ............... | 340/172.5 |
| 4,013,828 A | 3/1977 | Judice | ......................... | 358/133 |
| 4,322,795 A | 3/1982 | Lange et al. | ................ | 364/200 |
| 4,395,754 A | 7/1983 | Feissel | ...................... | 364/200 |

(Continued)

FOREIGN PATENT DOCUMENTS

| | | | | |
|---|---|---|---|---|
| EP | 0283735 A2 | 9/1988 | ...................... | 7/30 |
| EP | 0684583 A2 | 11/1995 | | |
| EP | 0691628 A2 | 1/1996 | | |

(Continued)

OTHER PUBLICATIONS

Yazici et al, "An index structure for fuzzy database", IEEE 1996, pp. 1375–1381.*
Cate et al, "Combining the concepts of compression and caching for a two–level file system", ACM 1991, pp. 200–209.*
Hammami, "Cache memories, fuzzy localities and fuzzy working sets", IEEE 1996, pp. 535–540.*
Freeman, H., "A Scheme For the Efficient Encoding of Graphical Data for Communication and Information Processing", Proceedings of the Electronics Congress–Advance In Electronics, Rassegna, IT, pp. 340–348, Mar. 24, 1969.
Freeman, H., "Computer Processing of Line–Drawing Images", ACM Computing Surveys, New York, NY, US, vol. 6, No. 1, pp. 57–97, Mar. 1974.

(Continued)

*Primary Examiner*—Uyen Le
(74) *Attorney, Agent, or Firm*—Lahive & Cockfield, LLP; John D. Lanza

(57) ABSTRACT

The present invention improves the performance of distributed systems by reducing the amount of graphical data transmitted between an application server and a thin client. The encoding technique used for graphical data is adapted in response to the repetitiveness of the graphical data during a particular client-server session. Indexes are maintained that are indicative of this repetitiveness and which identify a particular location in the client's cache memory storing the graphical data. Where the index is not found, but a fuzzy key indicates a strong likelihood that the graphical object is located at the client, the client's persistent storage memory is searched for a file name corresponding to the fuzzy key and which stores the graphical object therein.

30 Claims, 12 Drawing Sheets

U.S. PATENT DOCUMENTS

| | | | |
|---|---|---|---|
| 4,410,916 A | 10/1983 | Pratt et al. | 358/263 |
| 4,430,712 A | 2/1984 | Coulson et al. | 364/300 |
| 4,463,424 A | 7/1984 | Mattson et al. | 364/300 |
| 4,499,499 A | 2/1985 | Brickman et al. | 358/263 |
| 4,503,501 A | 3/1985 | Coulson et al. | 364/300 |
| 4,562,423 A | 12/1985 | Humblet | 340/347 |
| 4,691,281 A | 9/1987 | Furui | 364/200 |
| 4,701,745 A | 10/1987 | Waterworth | 340/347 |
| 4,701,871 A | 10/1987 | Sasaki et al. | 364/718 |
| 4,796,003 A | 1/1989 | Bentley et al. | 341/95 |
| 4,807,029 A | 2/1989 | Tanaka | 358/133 |
| 4,862,392 A | 8/1989 | Steiner | 364/522 |
| 4,870,662 A | 9/1989 | Lindbergh et al. | 375/122 |
| 4,899,149 A | 2/1990 | Kahan | 341/67 |
| 4,905,141 A | 2/1990 | Brenza | 364/200 |
| 4,928,247 A | 5/1990 | Doyle et al. | 364/518 |
| 4,992,954 A | 2/1991 | Takeda et al. | 364/518 |
| 5,001,478 A | 3/1991 | Nagy | 341/67 |
| 5,016,009 A | 5/1991 | Whiting et al. | 341/106 |
| 5,049,881 A | 9/1991 | Gibson et al. | 341/95 |
| 5,051,745 A | 9/1991 | Katz | 341/51 |
| 5,115,479 A | 5/1992 | Murayama | 382/56 |
| 5,119,319 A | 6/1992 | Tanenbaum | 364/514 |
| 5,126,739 A | 6/1992 | Whiting et al. | 341/106 |
| 5,140,321 A | 8/1992 | Jung | 341/55 |
| 5,155,485 A | 10/1992 | Sako et al. | 341/95 |
| 5,161,015 A | 11/1992 | Citta et al. | 358/162 |
| 5,164,727 A | 11/1992 | Zakhor et al. | 341/143 |
| 5,195,034 A | 3/1993 | Garneau et al. | |
| 5,233,701 A | 8/1993 | Nakata | 395/425 |
| 5,241,625 A | 8/1993 | Epard et al. | 395/163 |
| 5,269,003 A | 12/1993 | Roskowski et al. | 395/166 |
| 5,305,440 A | 4/1994 | Morgan et al. | 395/200 |
| 5,315,698 A | 5/1994 | Case et al. | 395/162 |
| 5,321,806 A | 6/1994 | Meinerth et al. | 395/162 |
| 5,339,411 A | 8/1994 | Heaton, Jr. | 395/600 |
| 5,345,588 A | 9/1994 | Greenwood et al. | 395/650 |
| 5,347,578 A | 9/1994 | Duxbury | 380/4 |
| 5,357,623 A | 10/1994 | Megory-Cohen | 395/425 |
| 5,384,568 A | 1/1995 | Grinberg et al. | 341/51 |
| 5,390,318 A | 2/1995 | Ramakrishnan et al. | 395/425 |
| 5,394,531 A | 2/1995 | Smith | 395/425 |
| 5,406,279 A | 4/1995 | Anderson et al. | 341/51 |
| 5,414,704 A | 5/1995 | Spinney | 370/60 |
| 5,426,752 A | 6/1995 | Takahasi et al. | 395/400 |
| 5,434,992 A | 7/1995 | Mattson | 395/425 |
| 5,442,771 A | 8/1995 | Filepp et al. | 395/650 |
| 5,455,576 A | 10/1995 | Clark, II et al. | 341/50 |
| 5,473,742 A | 12/1995 | Polyakov et al. | 395/142 |
| 5,485,460 A | 1/1996 | Schrier et al. | 370/94.1 |
| 5,491,808 A | 2/1996 | Geist, Jr. | 395/427 |
| 5,515,111 A | 5/1996 | Guedalia | 348/427 |
| 5,515,508 A | 5/1996 | Pettus et al. | 395/200.01 |
| 5,521,597 A | 5/1996 | Dimitri | 341/51 |
| 5,537,551 A | 7/1996 | Denenberg et al. | 395/200.18 |
| 5,537,635 A | 7/1996 | Douglas | 395/250 |
| 5,561,786 A | 10/1996 | Morse | 395/497.01 |
| 5,566,288 A | 10/1996 | Koerhsen | 395/142 |
| 5,572,206 A | 11/1996 | Miller et al. | 341/51 |
| 5,579,507 A | 11/1996 | Hosouchi et al. | 395/497.02 |
| 5,588,138 A | 12/1996 | Bai et al. | 395/497.04 |
| 5,651,136 A | 7/1997 | Denton et al. | 395/445 |
| 5,652,854 A | 7/1997 | Wong | 395/416 |
| 5,682,486 A | 10/1997 | Grossman et al. | |
| 5,717,893 A | 2/1998 | Mattson | 395/456 |
| 5,729,710 A | 3/1998 | Magee et al. | 395/413 |
| 5,740,171 A | 4/1998 | Mazzola et al. | 370/392 |
| 5,757,795 A | 5/1998 | Schnell | 370/392 |
| 5,761,734 A | 6/1998 | Pfeffer et al. | 711/164 |
| 5,771,034 A | 6/1998 | Gibson | 345/141 |
| 5,771,383 A | 6/1998 | Magee et al. | 395/680 |
| 5,784,070 A | 7/1998 | Furuhashi et al. | 345/419 |
| 5,802,281 A | 9/1998 | Clapp et al. | |
| 5,826,027 A | 10/1998 | Pedersen et al. | 395/200.51 |
| 5,835,959 A | 11/1998 | McCool et al. | 711/171 |
| 5,850,632 A | 12/1998 | Robertson | 711/170 |
| 5,864,678 A | 1/1999 | Riddle | 395/200.65 |
| 5,864,711 A | 1/1999 | Mairs et al. | 395/826 |
| 5,883,640 A | 3/1999 | Hsieh et al. | |
| 5,886,707 A | 3/1999 | Berg | 345/433 |
| 5,913,230 A | 6/1999 | Richardson | 711/203 |
| 5,918,019 A | 6/1999 | Valencia | 395/200.57 |
| 5,930,493 A * | 7/1999 | Ottesen et al. | 725/92 |
| 5,936,940 A | 8/1999 | Marin et al. | |
| 5,961,588 A | 10/1999 | Cooper et al. | 709/203 |
| 5,968,132 A | 10/1999 | Tokunaga et al. | 709/247 |
| 5,983,190 A | 11/1999 | Trower, II et al. | 704/276 |
| 6,014,133 A | 1/2000 | Yamakado et al. | 345/199 |
| 6,016,535 A | 1/2000 | Krantz et al. | 711/171 |
| 6,023,749 A | 2/2000 | Richardson | 711/203 |
| 6,052,120 A | 4/2000 | Nahi et al. | 345/326 |
| 6,057,857 A | 5/2000 | Bloomfield | 345/441 |
| 6,061,714 A | 5/2000 | Housel, III et al. | 709/203 |
| 6,061,715 A * | 5/2000 | Hawes | 709/203 |
| 6,081,623 A | 6/2000 | Bloomfield et al. | 382/239 |
| 6,163,773 A * | 12/2000 | Kishi | 706/16 |
| 6,181,711 B1 | 1/2001 | Zhang et al. | |
| 6,233,606 B1 * | 5/2001 | Dujari | 709/213 |
| 6,397,259 B1 | 5/2002 | Lincke et al. | |
| 6,453,343 B1 * | 9/2002 | Housel, III et al. | 709/213 |
| 6,603,470 B1 | 8/2003 | Deering | |
| 6,657,954 B1 | 12/2003 | Bird et al. | |
| 6,731,600 B1 | 5/2004 | Patel et al. | |
| 6,801,499 B1 | 10/2004 | Anandakumar et al. | |
| 2001/0019630 A1 | 10/2001 | Johnson | |
| 2002/0049833 A1 | 4/2002 | Kikinis | |
| 2003/0084052 A1 | 5/2003 | Peterson et al. | |

FOREIGN PATENT DOCUMENTS

| | | | | |
|---|---|---|---|---|
| EP | 0734144 A2 | 9/1996 | | 15/28 |
| EP | 0739140 A2 | 10/1996 | | 7/26 |
| EP | 0684582 A3 | 4/1997 | | 15/2 |
| EP | 0 818 753 A2 | 1/1998 | | 9/20 |
| EP | 0836145 A2 | 4/1998 | | |
| GB | 2136171 A1 | 9/1984 | | |
| GB | 2 323 946 A | 10/1998 | | 17/30 |
| JP | 06125363 | 5/1994 | | |
| WO | 94/03853 | 2/1994 | | 3/14 |
| WO | 95/20863 | 8/1995 | | 7/26 |
| WO | 97/18635 | 5/1997 | | 29/6 |
| WO | 97/28623 | 8/1997 | | |

OTHER PUBLICATIONS

*Patents on data compression algorithms*; available web site: www.iapr–ic.dimi.uniud.it; accessed on: Mar. 31, 1998; p. 1–10.

"The Norton Utilities Version 5.0 Disk Explorer", Copyright © 1990 Peter Norton Computing, Inc.; (pp. 28–54); Santa Monica, CA.

"Word Based Data Compression Schemes" by Bar–Ness & Peckham, © 1989 (pp. 300–303), The Center for Communication and Signal Processing Research Department of Electrical Engineering, NJIT Newark, NJ.

"A New Source Coding Method Based on LZW Adoptind the Least Recently Used Deletion Heuristic" by Hayashi, Kubo, Yamazoto & Sasase; (pp. 190–193); May 19, 1993; University of Victoria.

Murray, et al., "1.5 Move–to–Front Coding", 4 pp. 16–19, 1994.

"Creating a Wider Bus Using Caching Techniques" by Citron & Rudolph; Institute of Computer Science, Hebrew University; Jerusalem, Israel; ©1995 IEEE, pp. 90–99.

European Search Report, Application No. EP03 00 4803.6, 3 pgs.

European Search Report, Application No. EP03 00 5804.4, 3 pgs.

European Search Report, Application EP03 00 5805.1, 3pgs.

European Search Report, Application No. EP03 00 5806.9, 3 pgs.

IBM Technical Disclosure Bulletin, "Mechanisms for Finding Substitute Fonts in a Conference–Enabled X Windows Application", vol. 41, No. 01, Jan. 1998, pp. 137–142.

IBM Technical Disclosure Bulletin, "Remote Desktop Environments Reflected in Local Desktop Windows", vol. 36 No. 3, Mar. 1993, pp. 421–426.

WebTV, "WebTV System Guide", http://developer.webtv.net/authoring/sysgde/sysgde.html, Sep. 13, 2000, pp. 1–12.

* cited by examiner

| ANGLE | LOOKS LIKE | TO GET TO NEXT STRIP FROM LAST POINT IN PREVIOUS STRIP |
|---|---|---|
| 0 | → → → | SAME x, y-- |
| 1 | ↗ ↗ ↗ | SAME x, y++ |
| 2 | ↗ ↗ | x--, SAME y |
| 3 | ↑ ↑ ↑ ↑ | x++, SAME y |
| 4 | ↑ ↑ ↑ | x--, SAME y |
| 5 | ↙ ↙ ↙ | x++, SAME y |
| 6 | ↖ ↖ ↖ | SAME x, y++ |
| 7 | ← ← | SAME x, y-- |
| 8 | ← ← ← | SAME x, y++ |

| ANGLE | LOOKS LIKE | TO GET TO NEXT STRIP FROM LAST POINT IN PREVIOUS STRIP |
|---|---|---|
| 9 | ↙ ↙ ↙ | SAME x, y-- |
| 10 | ↘ ↘ | x++, SAME y |
| 11 | ↓ ↓ | x--, SAME y |
| 12 | ↓ ↓ ↓ | x++, SAME y |
| 13 | ↘ ↘ ↘ | x--, SAME y |
| 14 | ↘ ↘ ↘ | SAME x, y-- |
| 15 | → → → | SAME x, y++ |

FIG. 10

METHOD AND SYSTEM FOR EFFICIENTLY REDUCING GRAPHICAL DISPLAY DATA FOR TRANSMISSION OVER A LOW BANDWIDTH TRANSPORT PROTOCOL MECHANISM

CROSS-REFERENCE TO RELATED APPLICATIONS

This claims priority to and the benefit of U.S. provisional patent application Nos. 60/207,532, filed May 26, 2000, and 60/225,217, filed Aug. 14, 2000, the entirety of which are incorporated herein by reference.

FIELD OF THE INVENTION

The present invention relates generally to communication between an application server and a thin client in a distributed system and, in particular, to the reduction in the amount of graphical display data transmitted over a low bandwidth transport protocol mechanism.

BACKGROUND OF THE INVENTION

Distributed computer systems utilize the technique of distributing application execution. More specifically, an application server locally executes an application program and provides the application output data to clients/network users who then display the results on a display screen coupled to their local computer. By performing the application processing functions at the server and displaying the application output at the client, these distributed systems make the best use of server and client resources, i.e., the more capable server performs the compute and memory intensive application processing functions while the client, with potentially greater video performance, displays the output. During execution of the application program, a user of the client views the application output data on the client's display and interacts with the application program via keyboard or mouse inputs. The client user's inputs correspond to requests to the application server to perform certain actions that affect the operation of the application program. The application server passes these requests to the application for further processing. The application server also intercepts the application output data, generated by the application program and typically targeted to the operating system of the application server, and transmits all or part of the data to the client for display. From the perspective of the user, the application program seems to be executing locally even though it is actually being executed on a remote server and just being displayed locally.

The performance of distributed systems depends to a large degree on the capability of the network, which couples the client and the server, and therefore on the amount of graphical data (corresponding to the application output data) that is transmitted over the network. Since the application server and the client workstation are generally linked only by a transport mechanism (such as serial lines, telephone lines, local area networks and wide area networks) that possesses lower bandwidth than would be otherwise available if the application program were executing locally, the perceived performance of the distributed system may suffer. Accordingly, manufacturers of distributed systems/software continually strive to improve the performance of such systems.

SUMMARY OF THE INVENTION

The present invention improves the performance of distributed systems by reducing the amount of graphical data (e.g., bitmapped graphical data, encoded bitmaps, glyphs, and line data) transmitted between the server and the client. The invention achieves this reduction in several different ways, for example, by encoding the graphical data into a smaller object, by representing a graphical object with indicia of the object, by increasing the repetitiveness of the data in the protocol stream so that compression algorithms operate more efficiently, by tracking and leveraging the prior transmissions of identical/repetitive graphical objects, by adapting the rate of processing activity or the encoding technique in response to changes in the network performance or in response to performance mismatches between the client and server, and in several other ways described herein.

In one embodiment, the present invention enables the efficient transmission of graphical display data from an application server node to a client node. In this embodiment, the invention intercepts a plurality of graphical display information commands issued by an application executing on the server. Once these commands have been intercepted or otherwise obtained, they are analyzed to determine whether they should be selected for further transmission to remote client nodes. The selected commands are then encoded and packaged into a protocol packet stream for eventual transmission to the remote client nodes. Prior to transmission, the packet stream can be further compressed by subjecting the encoded packets to compression techniques.

The encoding technique of the present invention substantially maximizes compression of the protocol packet stream by building in repeatability into the protocol stream that allows the compression algorithm to substitute pointers for repetitive data. This technique focuses on maximizing the efficiency of the compression algorithm, rather than solely reducing the amount of data via encoding prior to transmission. The result of this encoding scheme is that the degree of compression is significantly increased for many types of graphical data. The encoding technique of the present invention encodes the graphical data so that portions of the graphical data that repeat are encoded in the same manner. The compression algorithm then operates on this repetitive encoded data to realize a greater degree of efficiency.

In one embodiment, the present invention efficiently reduces the amount of repetitive graphical data transmitted to a remote display device coupled to the client. In this embodiment, a server agent searches for an index (that may have been previously stored on the server by the server agent) associated with the graphical data and which is indicative of a prior transmission of the graphical data to a client agent. The index or handle represents a memory location in the client's cache memory that currently stores the previously transmitted graphical data. If the index is found, then the index is transmitted to the client agent, thus avoiding the need to transmit the graphical data itself. The client agent obtains the graphical object stored in the cache location identified by the index and performs additional processing activities as directed by the server agent. In one aspect of the invention, commands and information transmitted between the server agent and the client agent are queued at the server. The commands in the queue can then be processed in accordance with an estimate of the relative performance between the client and server agents or computers.

If the server agent is unable to locate the index, the server agent searches a fuzzy database for a fuzzy key that is associated with the graphical data. The fuzzy key, for example, corresponds to a length of the graphical data. The fuzzy key indicates that the graphical data had at one time been transmitted to the client and that there is a strong likelihood that the graphical data is stored within the client's persistent storage memory. One or more fuzzy keys are provided to the server agent upon initiating a session between the client and server agents. Alternatively, the fuzzy keys are transmitted to the server agent in accordance with a predetermined polling interval. Regardless of how the fuzzy keys are received, the server agent stores them in the fuzzy database for subsequent use during the client/server session. The fuzzy database relating to a particular session can also be maintained beyond the term of the session so that it is available for future sessions, by, for example, having the client agent persistently cache the graphical data from the particular session and causing the server agent to dynamically construct the fuzzy database on the server from the client's persistently-cached graphical data during a future session. This may prove useful in environments where frequent, but short, sessions are present.

If the fuzzy key is located, then the server agent transmits the fuzzy key together with a command to the client agent, which, for example, retrieves the graphical data stored in its persistent storage memory and copies it into its volatile memory. If the client agent fails to retrieve the graphical data, the server agent can transmit the graphical data, together with a recovery marker, to the client agent.

If the server agent is unable to locate the fuzzy key within the fuzzy database, the server agent forms the fuzzy key and stores the fuzzy key in the fuzzy database. The server agent then transmits the fuzzy key, an index, and the graphical data to the client agent, which is instructed to store the data in the client's volatile memory associated with the index. As the client-server session continues and the client's volatile memory becomes full, graphical data will be transferred into the client's persistent storage. In one aspect the client agent stores the graphical data in a file residing in the persistent storage memory that reflects the fuzzy key as part of the file's name.

In one aspect of the invention, the server agent instructs the client agent to update an off-screen surface coupled to the client agent using the graphical data identified by the server agent and/or stored in the client's volatile or persistent storage memory. These instructions can be triggered in response to a change in the off-screen surface, such as when the off-screen surface and on-screen surface of the client node interact. If the client agent fails to update the off-screen surface in accordance with the server agent's instructions, the server agent can transmit the graphical data to the client agent and direct that the client agent update portions of its on-screen or off-screen surfaces, which may have been corrupted, with the transmitted graphical data.

Further, the encoding technique used to encode the graphical data prior to transmission can be selected based on an estimate of the network conditions of the network that couples the client agent with the server agent. This estimate can correspond to a time differential measured by the client agent that relates to the amount of time expended to receive a particular encoded graphical data.

In one embodiment, the present invention adapts a processing rate in response to changing network conditions. In one aspect of the invention, the server agent processes graphical data addressed to the client agent at a first rate. By determining the network conditions of the network that couples the client and server agents, the server agent can adjust its processing rate from the first rate to a second rate in response to a change in the network conditions. The server agent can determine information about the network conditions by transmitting the processed graphical data to the client agent and instructing the client to measure a time differential associated with the transmission or receipt of the graphical data. In this manner, the time differential provides an indicator of the network conditions and the server agent can rationally select the second rate in accordance with this time differential. Similarly, the encoding technique used while processing the graphical data by the server agent at the first rate can be modified to a second encoding scheme/technique in response to changes in the network conditions that are determined by the server agent. The network conditions can be estimated in accordance with the time differential discussed previously. Once the second encoding technique is selected by the server agent, the server agent will process subsequent graphical data using this second encoding technique.

In one embodiment, the invention adapts a processing rate of the server in response to a performance mismatch between the server and the client coupled to the server via the network. In operation, the server agent processes graphical data and determines a first time period associated with such processing. For example, the first time period can be determined by scrolling a frame buffer of the server. The client agent also processes the graphical data and determines a second time period associated with its processing. The server agent then determines the time differential between the first and second time periods and adjusts its processing rate in accordance therewith.

In one embodiment, the invention efficiently reduces the amount of graphical line data transmitted from a server to a client via a communications network. The server agent separates a path defining a line or region into a plurality of strips, where each of the strips have a beginning and an endpoint coordinate defined within a coordinate system (e.g., a Cartesian coordinate system). The coordinate system corresponds to a region of a display surface associated with the client. In one aspect of the invention, the server agent quantizes the coordinate system into a plurality of quantized angles (e.g., 16 quantized angles) and determines the endpoint coordinate of one of the plurality of strips. The coordinate system is then normalized so that its origin coincides with this endpoint coordinate. The beginning coordinate of the adjacent strip in the path is then associated by the server agent with the endpoint coordinate of the first strip. The server agent then selects one of the quantized segments of the coordinate system as corresponding to an approximate angle of the adjacent strip. This technique enables the transmission of the difference between the endpoint coordinates of the two strips (i.e., the strip length) and an indication of the selected quantized angle and thus avoids having to transmit both sets of coordinates or a coordinate and the precise angle for each strip.

In one embodiment of the invention, the server agent remotely controls the formation of an off-screen surface at a client, which is coupled to the server via a communications network. The server agent informs the client agent that an off-screen surface of a particular size or type is to be formed within the client's memory and the client agent responds by selecting and allocating a first memory region having an appropriate format to represent the off-screen surface from a plurality of available memory regions in the client's memory. The server agent then either transmits a bitmap or an indicia of the bitmap (e.g., index or fuzzy key) to the client agent and instructs the client agent to copy the bitmap to a particular location within the first memory region. Once the bitmap is copied to the off-screen surface, it can be used to update the client's on-screen surface. Such off-screen operations can also be performed for non-bitmap data, such as lines or text.

The server agent can also respond to error conditions by storing a duplicate of the client's off-screen surface in the server's local memory. In the event of an error condition, such as when a preselected memory region of the client's memory is not sufficiently large enough to store a particular off-screen surface, the client agent asynchronously informs the server agent of the error. In response to the error condition, the server agent transmits at least one portion of its duplicate off-screen surface or a copy of the bitmap to the client agent and instructs the client agent to update the client's on-screen surface using the transmitted duplicate off-screen surface data.

BRIEF DESCRIPTION OF THE DRAWINGS

The foregoing discussion will be understood more readily from the following detailed description of the invention, when taken in conjunction with the accompanying drawings, in which:

FIG. 10 provides a table, which illustrates how to get to the next strip from the endpoint of the previous strip, for strips in each of the quantized segments of FIG. 8B in accordance with an embodiment of the present invention.

DETAILED DESCRIPTION OF THE INVENTION

The present invention reduces the amount of graphical data transmitted between an application server, which is executing an application program, and a subscribing client, which is locally displaying the output data of the application program, by encoding the data into relatively small representations that repeat within the protocol stream transmitted between the client and the server. In this manner, the invention minimizes the size of each discrete data element that must be transmitted and increases the repeatability of the data within the protocol stream so that compression algorithms that operate more efficiently on repetitive encoded data can realize a greater degree of compression efficiency. The invention uses a number of techniques to realize this enhanced compression, including the following: scanning a command queue for later-issued commands which supercede earlier-issued commands; disk-caching techniques that improve compression of data that has been previously encountered during a client-server session; transmission of relative coordinates using quantized regions to avoid sending both endpoints and/or the angle of an associated strip; and manipulation of off-screen surfaces to enhance performance during the client-server session. The invention also reduces the frequency of overscroll problems encountered when there is a performance mismatch between a fast server and a relatively slow network or client.

Figure 1:
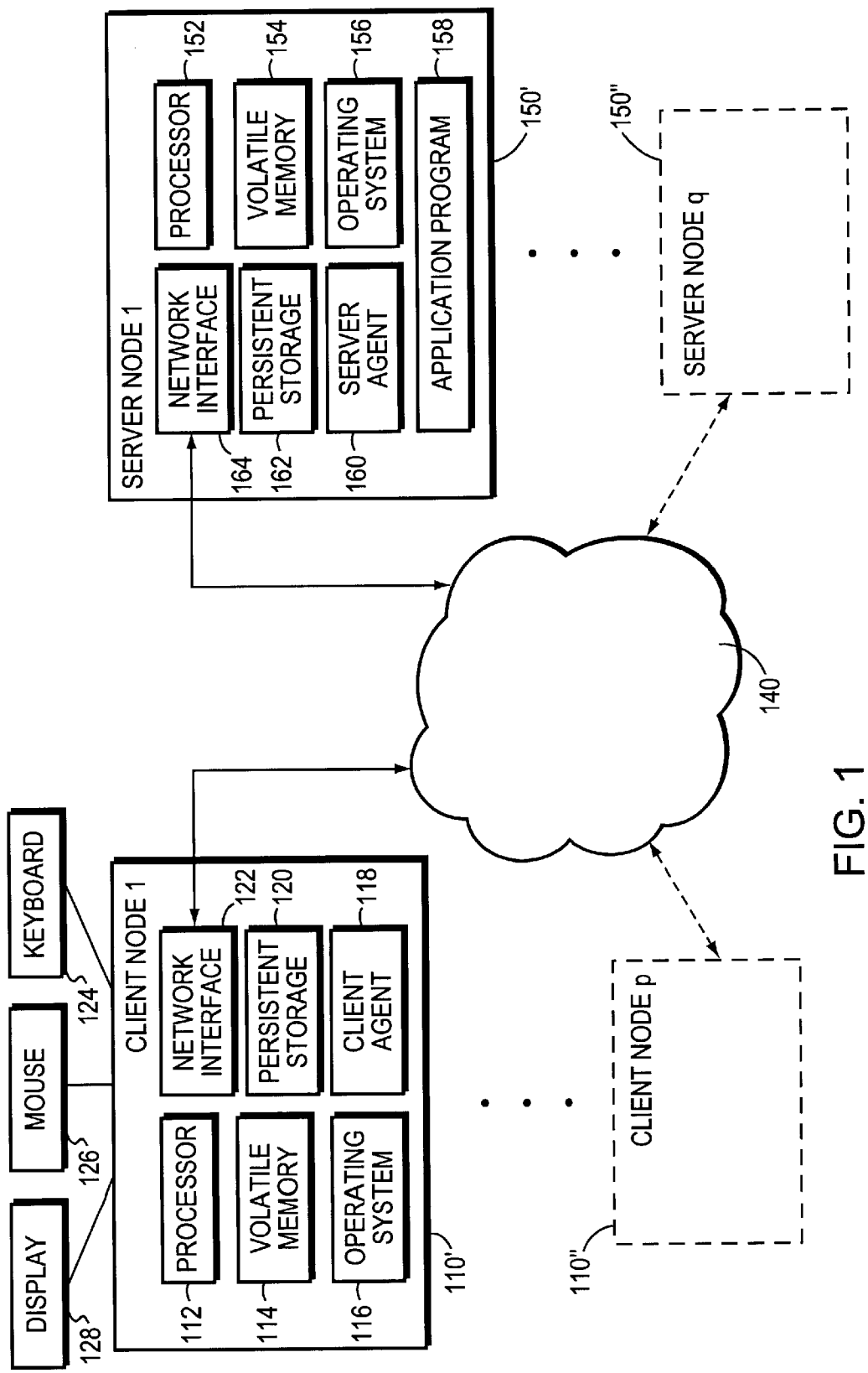
FIG. 1 schematically illustrates a client node coupled to a server node via a communication network, where the client and server nodes each have respective client and server agents operating in accordance with an embodiment of the present invention.

With reference to FIG. 1, one or more client nodes 110', 110" (hereinafter each client node or plurality of client nodes is generally referred to as 110) are in communication with one or more server nodes 150', 150" (hereinafter each server node or plurality of server nodes is generally referred to as 150) via a communications network 140. The network 140 can be a local-area network (LAN), a medium-area network (MAN), or a wide area network (WAN) such as the Internet or the World Wide Web. Users of the client node 110 can be connected to the network 140 through a variety of connections including standard telephone lines, LAN or WAN links (e.g., T1, T3, 56 kb, X.25), broadband connections (ISDN, Frame Relay, ATM), and wireless connections. The connections can be established using a variety of communication protocols (e.g., TCP/IP, IPX, SPX, NetBIOS, and direct asynchronous connections). In some particularly advantageous embodiments, the protocol used may be the Independent Computing Architecture protocol manufactured by Citrix Systems, Inc. of Fort Lauderdale, Fla. or the Remote Display Protocol manufactured by Microsoft Corporation of Redmond, Wash.

The client node 110 can be any personal computer (e.g., 286, 386, 486, Pentium, Pentium II, Macintosh computer), Windows-based terminal, Network Computer, wireless device, information appliance, RISC Power PC, X-device, workstation, mini computer, main frame computer or other computing device that has a windows-based desktop and sufficient memory for executing a small, display presentation program. The display presentation program uses commands and data sent to it by the application server 150 across the network 140 to render a graphical display. In a distributed computer system model, the execution of application programs occurs primarily on the application server 150 and the user interface, keystrokes, and mouse movements produced by client-side inputs are transmitted over the network 140 to and from the client node 110.

The client node 110 typically includes a processor 112, a volatile memory 114 (e.g., RAM cache), an operating system 116, a client agent 118, a persistent storage memory 120, a network interface 122 (e.g., a network interface card), a keyboard 124, a mouse 126, and a display 128. Windows-oriented platforms supported by the client node 110 can include, without limitation, WINDOWS 3.x, WINDOWS 95, WINDOWS 98, WINDOWS NT 3.51, WINDOWS NT 4.0, WINDOWS 2000, WINDOWS CE, MAC/OS, Java, and UNIX. The client agent 118 corresponds to a software program that receives commands and data from the server node 150 and from a user (not shown) of the client node 110. The client agent 118 uses the received information when interacting with other components of the client node 110 (e.g., when directing the operating system 116 to output data onto the display 128). The client agent 118 also transmits requests and data to the server node 150 in response to server-issued commands or user actions at the client node 110.

Similarly, the server node 150 includes a processor 152, a volatile memory 154, an operating system 156, an application program 158, a server agent 160, persistent storage memory 162, and a network interface 164. The server agent 160 corresponds to a software program that interfaces with the client agent 118 and other components of the server node 150 to support the remote display and operability of the application program 158.

Each application server 150 hosts one or more application programs 158 that can be accessed by the client nodes 110. Examples of such applications include word processing programs such as MICROSOFT WORD and spreadsheet programs such as MICROSOFT EXCEL, both manufactured by Microsoft Corporation of Redmond, Wash., financial reporting programs, customer registration programs, programs providing technical support information, customer database applications, or application set managers.

During execution of the application program 158, a server 150 communicates with the client node 110 over a transport mechanism (part of the server agent 160). In one embodiment, the transport mechanism provides multiple virtual channels and one of the virtual channels provides a protocol for transmission of graphical screen data from the server node 150 to the client node 110. The server 150 executes a protocol driver (part of the server agent 160) that intercepts graphical display interface commands (generated by the application program 158 and targeted at the server's operating system 156) and translates them into a protocol packet suitable for transmission over the transport mechanism.

Figure 2:
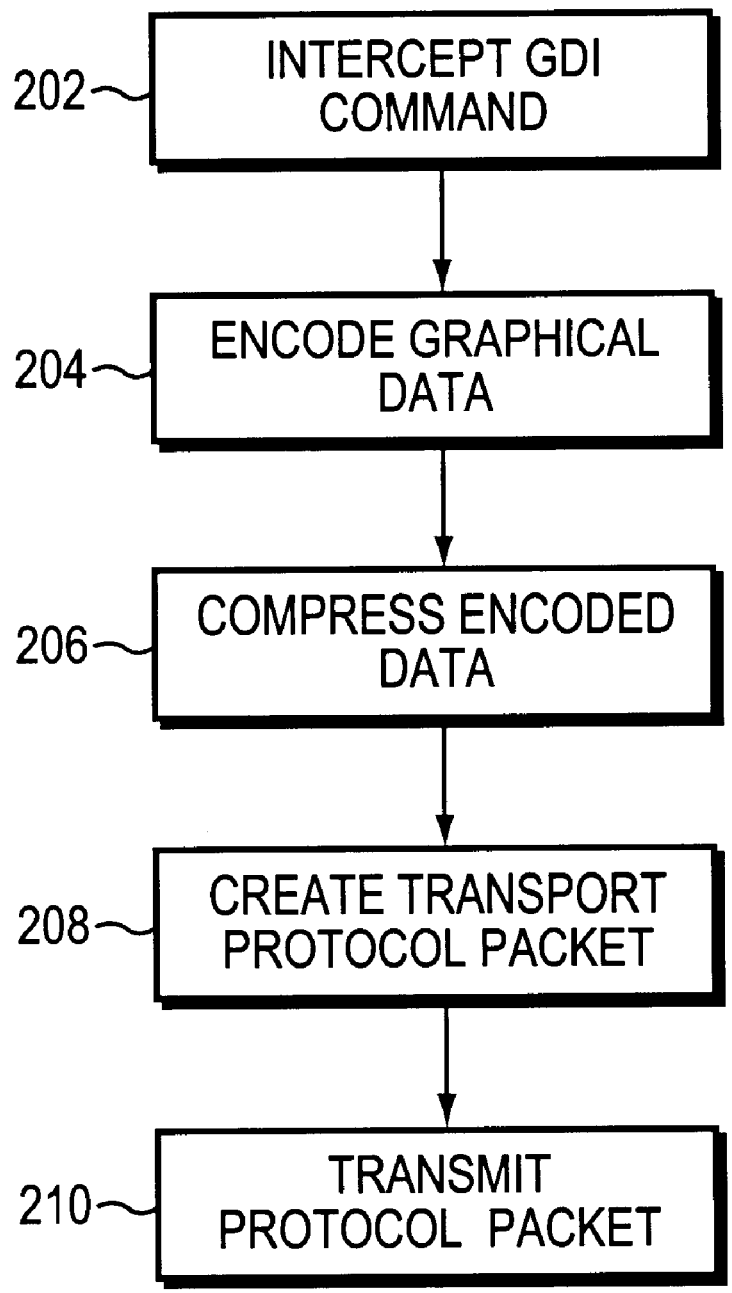
FIG. 2 provides a high-level flow diagram of the steps performed by the server agent of FIG. 1 in accordance with an embodiment of the present invention.

In one embodiment and with reference to FIG. 2, the server agent 160 intercepts a graphical display interface command (step 202) issued by the application program 158 and directed to the operating system 156, encodes graphical data associated with the command and the application program 158 (step 204), compresses the encoded graphical data (step 206), creates a transport protocol packet incorporating the intercepted command and compressed, encoded data (step 208), and transmits the transport protocol packet to the target client node 110 (step 210). Graphical data refers to any type of data that can be displayed on the display 128, such as bitmaps, glyphs, coordinates, list of lines, strips, etc. Hereinafter, descriptions of techniques which are applied to particular types of graphical data or graphical objects can be construed to apply to all types of graphical data.

More particularly, a protocol driver of the server agent 160 intercepts the graphical display interface commands (step 202). In one embodiment the protocol driver intercepts high-level application programming interface calls made by the application program 158. In one embodiment, the protocol driver intercepts GDI commands provided by WINDOWS-based operating systems. In another embodiment, the protocol driver intercepts QUICKDRAW commands, provided by MAC/OS-based operating systems. In still other embodiments, the protocol driver intercepts lower-level commands, such as interface calls to the device driver associated with the graphical display of the server node 150. In still other embodiments, the graphical display interface command may be duplicated rather than intercepted. In these embodiments, the display of the application program output data on the server 150 and the client 110 will be substantially similar, if not identical. The protocol driver creates a transport protocol packet based on the intercepted graphical display command (step 208). The protocol driver may use a protocol command set that contains an analogous command for each possible intercepted display interface command. Alternatively, the protocol driver may use a command set that is a subset of the intercepted display interface commands. In other embodiments, the protocol command set may be a superset of the possible intercepted display interface commands.

For each intercepted GDI command and affected graphical data that must be transmitted to the client agent 118 in order to display the output of the application program 158 on the client's display 128, the server agent 160 queues the related protocol command together with a unique key 412 (FIG. 4) associated with the affected graphical data. The unique key 412 describes and uniquely identifies the graphical data. In one embodiment the unique key is generated by performing a 64 bit cyclic redundancy check (CRC) on the graphical data. In another embodiment, the 64 bit CRC is generated as two 32 bit CRCs, performed on the graphical data sequentially and in opposite directions. Other methods of generating a unique key associated with graphical data, as known to one skilled in the art, may also be used. The protocol command and the unique key 412 are queued at the server 150, together with other command/unique key sets. The queued commands are then scanned to ascertain whether later-issued commands (i.e., those near the back of the queue) supersede earlier-issued commands (i.e., those closer to the front of the queue). If the earlier-issued commands are superceded, then the server agent 160 removes them from the queue and thus avoids having to transmit unnecessary data to the client agent 118.

For example, a series of commands to display the next page of data issued in quick succession need not be displayed individually at the client 110. All that need be displayed is the last display page issued, since this last page of data will overwrite all previous pages of data. By removing the unnecessary commands and unique keys corresponding to the earlier pages from the server's queue, the server agent 160 substantially reduces the amount of data that must be processed and transmitted.

In one illustrative embodiment, only unnecessary commands and related data pertaining to opaque operations are removed from the server's queue. For example, if a previously-queued command involving the creation of a rectangular region having coordinates 10,10,50,50 is followed by a more recently-queued command involving the creation of a larger/covering rectangular region having coordinates 0,0,100,100, then the previously-queued command and related data is deemed unnecessary and is removed from the queue.

Table 1 below lists an exemplary set of protocol commands provided in one embodiment of the invention.

TABLE 1

PROTOCOL COMMANDS

| Protocol Command | Purpose |
| --- | --- |
| INIT | Initializes the protocol connection |
| SET_MOUSE_POINTER | Instructs the client agent 118 to form a mouse pointer |
| HIDE_MOUSE_POINTER | Instructs the client agent 118 to hide a mouse pointer |
| CHANGE_TEXT_MODE | Instructs the client agent 118 to change the mode of output text |
| CHANGE_TEXT_COLOR | Instructs the client agent 118 to change the foreground color of output text |
| CHANGE_TEXT_BACKGRND_COLOR | Instructs the client agent 118 to change the background color of the output text |
| NEW_SOLID_BRUSH | Instructs the client agent 118 to update the current brush setting using a new solid color |
| NEW_PATTERN_BRUSH | Instructs the client agent 118 to change the brush pattern |
| NULL_CLIP_REGION | Informs the client agent 118 that the current region is not clipped |
| SIMPLE_CLIP_REGION | Informs the client agent 118 that the current region is clipped along one side |
| COMPLEX_CLIP_REGION | Informs the client agent 118 that the current region is clipped along more than one side |
| CHANGE_PALETTE | Instructs the client agent 118 to change its color palette |
| TEXTOUT | Instructs the client agent 118 to output text, represented as one or more screen glyphs |
| DRAW_PATH | Instructs the client agent 118 to draw a simple or complex path, such as a line or bezier curve |
| BITBLT | Instructs the client agent 118 to draw a particular bitmapped object. |
| BITBLT_TRICK | Instructs the client agent 118 to draw the entire bitmap |
| PARTIAL_BITBLT_TRICK | Instructs the client agent 118 to draw a portion of the bitmap |
| SRC_TO_SRC_BLT | Instructs the client agent 118 to copy a particular portion of the drawing surface to another of the same surface |
| SOLID_FILL | Instructs the client agent 118 to fill a target region using an identified color |
| SOLID_FILL_NO_CLIPPING | Instructs the client agent 118 to fill a target region without clipping |
| SOLID_FILL_NEW_COLOR | Instructs the client agent 118 to fill a target region using a color that is different from the color last used |
| SOLID_FILL_NEW_COLOR_NO_CLIP | Instructs the client agent 118 to fill a target region using a color that is different from the color last used, without clipping |
| CACHE_NEW_OBJ | Sends data representing a new object to the client agent 118 for storage in the client's cache |
| CACHE_NEW_OBJ_INCOMPLETE | Sends partial data of a new object to the client agent 118 for storage in the client's cache |
| CACHE_EXTEND_OBJ | Sends additional data relating to a previously transmitted incomplete object and indicates that the object is complete |
| CACHE_EXTEND_OBJ_INCMPLT | Sends additional data relating to a previously transmitted incomplete object and indicates that more data will follow |
| CACHE_WRITE_DISK_OBJECTS | Instructs the client agent 118 to write its object cache, or a portion of its object cache to persistent storage |
| CACHE_PURGE_MEMORY_CACHE | Instructs the client agent 118 to purge its object cache, or a portion of its object cache |
| CACHE_READ_DISK_OBJECT | Instructs the client agent 118 to read data into its cache from persistent storage |
| START_STOPWATCH | Instructs the client agent 118 to start a timer and write the current time tick into an array element |
| STOP_STOPWATCH | Instructs the client agent 118 to determine the difference between the time |

TABLE 1-continued

PROTOCOL COMMANDS

| Protocol Command | Purpose |
|---|---|
| | tick recorded by the START_STOPWATCH command and the current time tick |
| SAVE_SCREEN_BITS | Instructs the client agent 118 to save a rectangular screen area and to associate it with a particular identifier |
| RESTORE_AND_FREE_SCREEN_BITS | Instructs the client agent 118 to restore a particular rectangular screen area and to then discard the screen data |
| FREE_SCREEN_BITS | Instructs the client agent 118 to discard specified data |
| CREATE_SURFACE | Instructs the client agent 118 to form an off-screen surface compatible with the current session color depth, associate the surface with an identifier, and associate attributes to the surface |
| DELETE_SURFACE | Instructs the client agent 118 to delete a particular off-screen surface |
| CHANGE_SURFACE | Instructs the client agent 118 to switch from a current destination surface to another specified surface |
| C2S_OSS_ERROR | Informs the server agent 160 of an error in a particular off-screen surface that makes it unavailable |
| C2S_INVALIDATE_OSS | Informs the server agent 160 that a particular off-screen surface has become dirty, i.e., that it is not the same as a duplicate surface accessible to the server agent 160 |
| C2S_UPDATE_DISK_KEYS | Instructs the server agent 160 to update its list of fuzzy keys |
| C2S_ACK_DISK_READS | Informs the server agent 160 that objects have been read into the client's cache |
| C2S_NACK_DISK_READ | Informs the server agent 160 that objects have not been read into the client's cache |
| C2S_STOPWATCH_RESULT | Sends the time differential between the start/stop stopwatch commands to the server agent 160 |
| C2S_ACK_INIT | Informs the server agent 160 that the protocol connection has been established |

In one embodiment, the protocol commands and associated graphical data are configured to maximize the repetition of information in the protocol packet stream created by the protocol driver. In one aspect of the invention, the graphical data is first encoded (step 204) prior to subjecting the encoded graphical data and/or protocol commands to a compression algorithm (step 206) that takes advantage of the repetitive nature of the protocol stream (e.g., a Lempel-Ziv compression protocol may be used). In one embodiment and upon the first instance of the graphical data in the client-server session, an indicia of the graphical data is transmitted together with the corresponding encoded data in the protocol stream so as to reduce the amount of data transferred via the network 140 for future instances of the graphical data occurring during the same client-server session. The compressed data is subsequently bundled into the transport protocol packet and transmitted to the client node 110 (step 208) for decompression and interpretation.

In one illustrative embodiment, the application program 158 executes a GDI command that instructs the server's operating system 156 to draw a bitmap. The server agent 160 intercepts this GDI command (step 202) and issues a BIT-BLT command to the client agent 118, which instructs the client agent 118 to display the application program's output data on the client's display 128. Prior to issuing the BITBLT command, the server agent 160 encodes the output data (step 204) and includes the encoded data, together with the BITBLT command in the compressed protocol packet stream transmitted to the client agent 118. In one embodiment, the data describing the bitmap 410 (FIG. 4) is encoded and compressed (steps 204 and 206) to take advantage of some of the redundancies present in the bitmap 410. For example, the bitmap 410 may be such that successive raster lines are redundant or adjacent pixels are redundant.

In addition to encoding bitmaps or other discrete graphical data elements based on their internal data redundancies, the invention also incorporates caching techniques that further improve the encoding and compression of graphical data that has been previously encountered during a particular client-server session. For example, when a particular bitmap is first encountered during a client-server session it is encoded as described above. For subsequent transmissions of the bitmap during the same client-server session, indicia of the bitmap can be transmitted rather than the relatively larger, encoded bitmap. In one embodiment, the indicia correspond to a location within the client's volatile memory that contains the previously transmitted bitmap.

Figure 3:
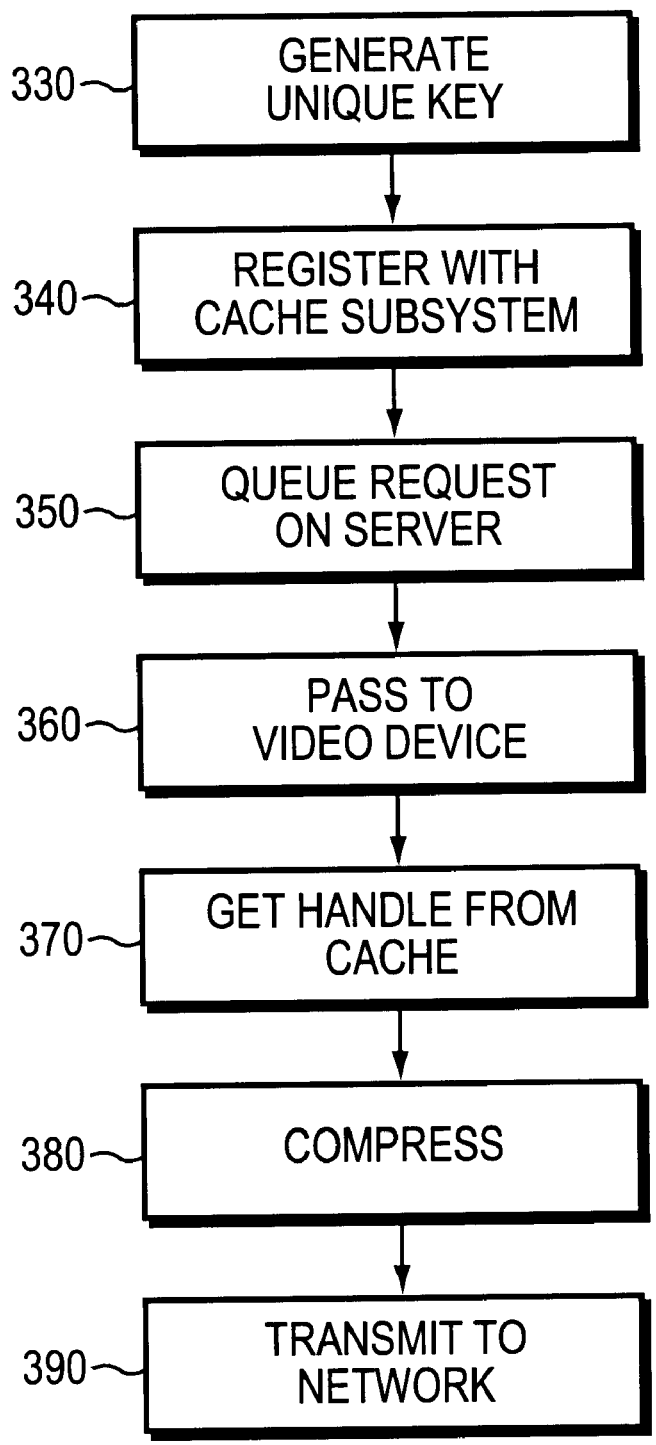
FIG. 3 provides a more detailed flow diagram to the diagram of FIG. 2 in accordance with an embodiment of the present invention.
Figure 4:
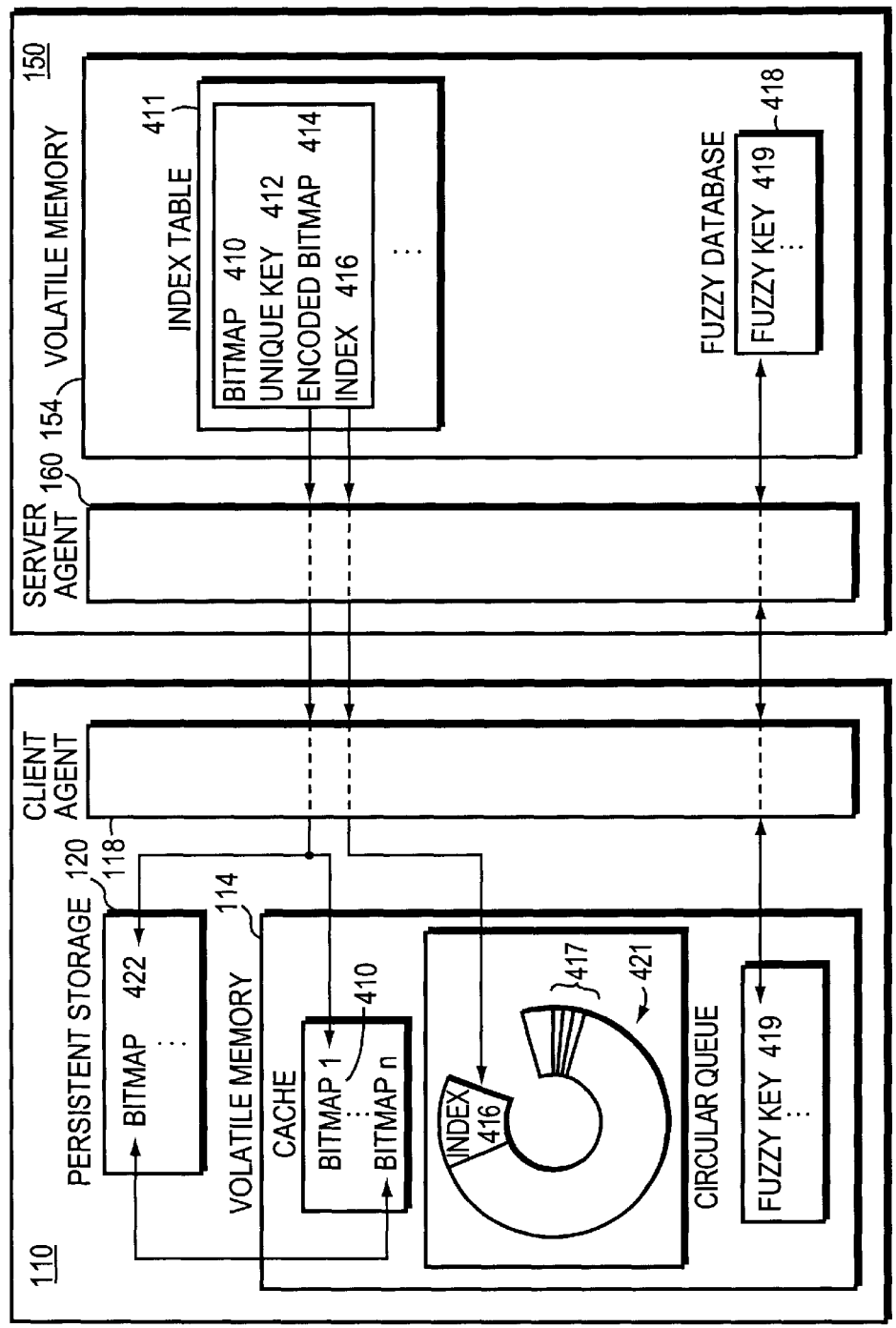
FIG. 4 schematically illustrates the contents of the client and server's volatile and persistent memory, as affected by operations of the client and server agents of FIG. 1, in accordance with an embodiment of the present invention.

More particularly and with reference to FIGS. 3 and 4, the server agent 160 generates the unique key 412 (step 330), as described above, and associates the unique key 412 with the graphical data (e.g., bitmap 410). This association essentially defines the bitmap 410 and its related data as a graphical object, which is subsequently registered, together with its unique key 412 and encoded data 414 (step 340), in a data structure 411 (e.g., a table) stored in the server's volatile memory 154 (e.g. the server's cache subsystem). In other embodiments, the bitmap-related data may be written into the server's persistent storage 162.

Assuming that the protocol command (e.g., BITBLT) and associated graphical data are not superceded by later-issued commands (as described previously), the server agent 160 dequeues (step 360) the BITBLT command and the unique key 412 from the queue and searches the table 411 stored in the server's volatile memory 154 to determine if the unique key 412 had been previously stored therein. If the unique key 412 is located within the table 411, then the server agent 160 determines that the encoded data 414 has been previously processed by the server 150. The server agent 160 then searches the table 411 for an index or handle 416 associated with the encoded bitmap 414. If the index 416 is located, then the server agent 160 determines that the encoded bitmap 414 has not only been processed by the server 150, but that it has also been previously transmitted to the client agent 118. If the index 416 is not located within the table 411, then the server agent 160 determines that the encoded bitmap 414 has not been previously transmitted.

In one embodiment, the index 416 identifies a particular location within the client's volatile memory 114, which stores the previously-transmitted encoded bitmap 414. In one embodiment, the client agent 118 provides a snapshot of its available volatile memory 114 to the server agent 160 upon initiating a client-server session with the server agent 160. Once the session is established, the server agent 160 thereafter controls the allocation of the client's available volatile memory 114. In this manner, the server agent 160 is able to allocate the client's volatile memory 114 to the encoded bitmap 414 and to maintain the index 416 as a pointer or reference to the allocated memory and as an identifier of the previously-transmitted encoded bitmap 414.

If the index 416 is located within the server's table 411, the server agent 160 obtains the index 416 (step 370), compresses the index 416 together with the related protocol command (step 380), and transmits the compressed data in a packet directed to the client agent 118 via the network 140. In one embodiment, the index 416 is shorter in length (e.g., 16 bits) than the unique key 412 (e.g., 64 bits), and consequently consumes less bandwidth when transmitted. Upon receipt and decompression of the compressed packet, the client agent 118 accesses the particular memory location in the client's volatile memory 114 that is specified by the index 416 in order to obtain the appropriate graphical data 410. The client agent 118 subsequently manipulates the obtained graphical data 410 in accordance with the command which accompanied the index 416 in the compressed packet. In this manner, the invention avoids having to retransmit relatively large bitmap or other graphical data that have been previously encountered during a particular client-server session.

If the index 416 is not located within the server's table 411 (and thus has not been previously transmitted to the client agent 118), the server agent 160 allocates a portion of the client's volatile memory 114 for the bitmap 410 and forms the index 416 that identifies the memory location. The server agent 160 then stores the encoded bitmap 414 (corresponding to the bitmap 410), the newly-formed index 416, and the unique key 412 associated with the encoded bitmap 414 in the server's table 411. The server agent 160 subsequently compresses the encoded bitmap 414, the index 416, and related command and transmits the compressed data in a packet directed to the client agent 118. Upon receipt and decompression, the client agent 118 decodes the encoded data 414 and stores the resulting bitmap 410 in the memory location identified by the index 416 and manipulates the resulting bitmap 410 in accordance with the accompanying command. Alternatively, the client agent 118 stores the encoded data 414 in the memory location identified by the index 416 and only decodes the encoded data 414 when necessary to further manipulate the resulting bitmap 410. In this manner, client memory is more efficiently used.

Although the invention has heretofore been described with the server agent 160 controlling the client's memory allocation and index formation, it is also possible that the client agent 118 perform these functions. For example, when a bitmap is first encountered during a client-server session and is encoded, compressed, and transmitted to the client agent 118 (with the accompanying command, but without the index 416), the client agent 118 can determine the particular location within its volatile memory 114 to store the bitmap 410. In this embodiment, the client agent 118 forms an index (not shown) that uniquely identifies the encoded bitmap and its corresponding memory location and transmits the index to the server agent 160, which stores the index in the appropriate location in the server's table 411.

Continuing with the embodiment in which the server agent 160 controls the allocation of the client's volatile memory 114, the client agent 118 maintains a circular queue 421 of all indexes specified by the server agent 160 in accordance with queue maintenance instructions also received therefrom. For example, the server agent 160 can direct the client agent 118 to disassociate a predetermined block of indexes 417 (e.g., corresponding to 128K of memory) from their respective graphical data in order to accommodate newly-encountered graphical objects when the client's volatile memory 114 is otherwise fully subscribed. Consequently, a subsequent new graphical object acquires a previously-used index.

The server agent 160 also determines, according to predetermined criteria, whether to purge or save each graphical object affected by the reassignment of the indexes. The server agent 160 communicates this decision to the client agent 118. For example, if the server agent 160 is reassigning indexes 0, 1, 2, and 3, and determines that the graphical objects associated with handles 0 and 2 are to be deleted or moved into the client's persistent storage 120 and the objects associated with handles 1 and 3 are to be saved, the server agent 160 thus instructs the client agent 118 to delete (or move) 0 and 2, and save 1 and 3. The client agent 118 then moves the index of each saved object to the tail of the circular queue. At least one index remains available at the queue tail for assignment to the moved object; that is, in one embodiment the head and tail of the queue do not point to the same index in the circular queue. Consequently, a moved object is both stored in a different physical memory location and associated with a different index.

The maintenance actions performed on the client's circular queue 421 will typically become more frequent as the client-server session continues and the limited volatile memory 114 of the client 110 becomes full of previously-transmitted bitmaps 410 or other graphical objects. Accordingly, the number of previously-transmitted graphical objects 422 that are moved into the client's persistent storage 120 from volatile memory 114 increases. The present invention further enhances the caching technique described above to search for indicia (see "fuzzy key" below) of previously-transmitted graphical objects 422 that may be stored in the client's persistent storage 120 when an index to that graphical object 422 is not found in the server's table 411. If such indicia is found, then there is a strong likelihood that the previously-transmitted graphical object 422 is still locally resident and accessible to the client agent 118 and that the graphical object 422 may not therefore need to be retransmitted from the server agent 150 to the client agent 110. It is important to note that locating such indicia provides a strong likelihood, but not a certainty, that the graphical object 422 is locally resident, because other programs or client agents which may share the same persistent storage 120 may have deleted the graphical object 422 from persistent storage 120 (e.g., to make room in the persistent storage for a new object).

Figure 5:
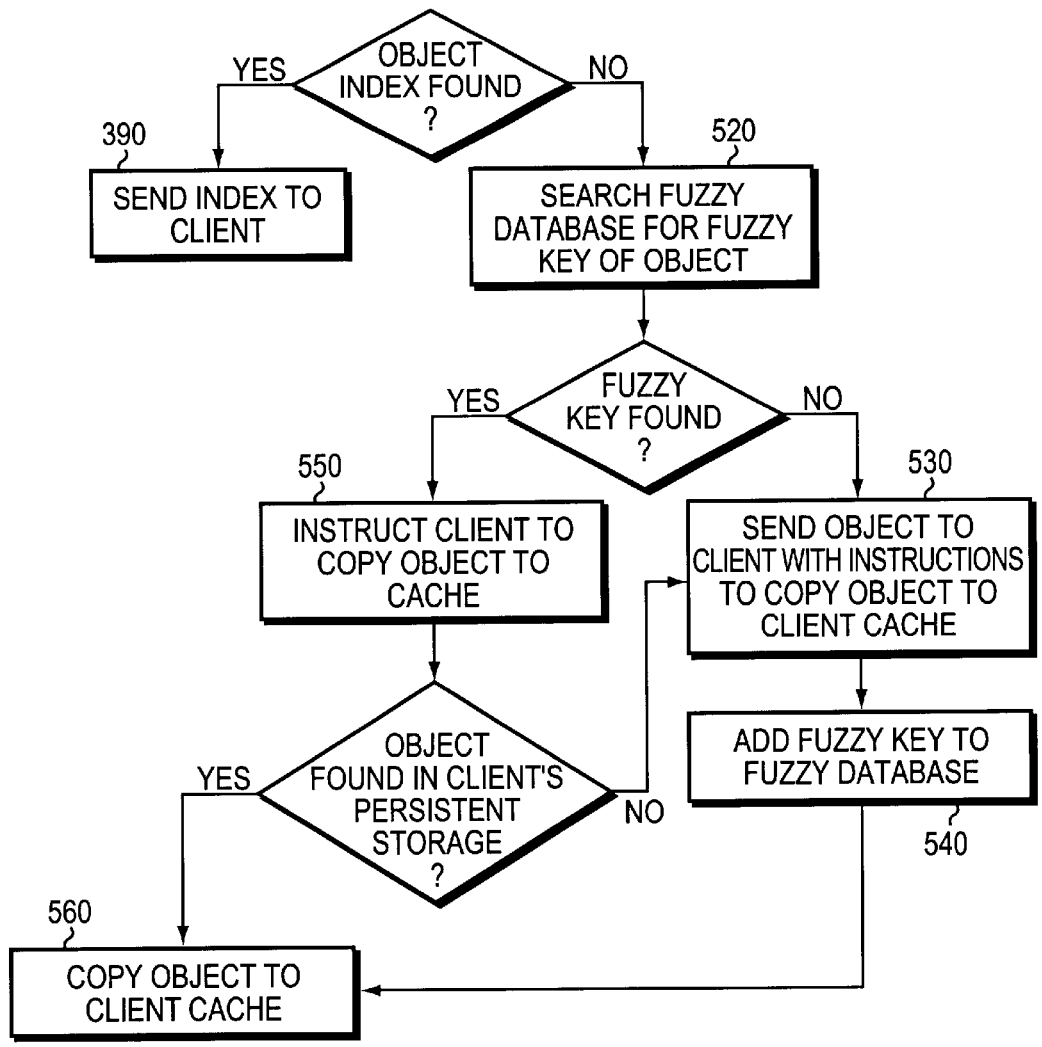
FIG. 5 provides a flow diagram of the steps taken to minimize the amount of data transmitted to the client by using caching techniques involving a fuzzy database and fuzzy keys, in accordance with an embodiment of the present invention.

More particularly and with reference to FIGS. 4 and 5, if the server agent 160 is unable to locate an index for a particular bitmap 422 in the server's index table 411, the server agent 118 searches a second table 418 (hereinafter "fuzzy database") for an entry 419 (hereinafter "fuzzy key") associated with the bitmap 422 (step 520). In one embodiment, each fuzzy key 419 is a combination of the unique key 412 in the server's table 411 and the length/size of the associated bitmap 422. The fuzzy key can be formed, for example, via an XOR (exclusive OR) of both 32-bit CRCs used to compute the 64-bit unique key 412 in the server's table 411 and the length of the bitmap 422 associated with the unique key 412. The fuzzy database 418 essentially provides an initial prediction as to whether the persistent storage 120 of the client 110 has a copy of the bitmap 422 stored therein. If the fuzzy database 418 does not contain the fuzzy key 419 associated with the bitmap 422, then the client's persistent storage 120 probably does not have a stored copy of the bitmap 422 and the server agent 160 will, therefore, need to transmit an encoded version of the bitmap 422 to the client agent 118, as previously described. On the other hand, if the fuzzy database 418 contains the fuzzy key 419 for the bitmap 422, then there is a strong possibility that the bitmap 422 is stored in the client's persistent storage 120.

In more detail, when the server agent 160 does not find a fuzzy key 419 in the fuzzy database 418 that is associated with the bitmap 422, the server agent 160 sends an encoded bitmap (corresponding to the bitmap 422) to the client agent 118 with a command that requests the client agent 118 to store the bitmap 422 (or the corresponding encoded bitmap) in the volatile memory 114 (step 530). Also and as described above, the server agent 160 adds the fuzzy key 419 associated with the bitmap 422 to the fuzzy database 418 (step 540). Note that the order of steps 530 and 540 can be reversed, such that the fuzzy database 418 is updated prior to the transmission of the command and the encoded version of the bitmap 422. The client agent 118 subsequently copies the bitmap 422 to a particular location within the client's volatile memory 114 as specified by the server agent 160 (step 560).

In one embodiment, the server agent 160 does not wait for an acknowledgement from the client agent 118 that the encoded bitmap associated with the bitmap 422 has been successfully received and processed. Rather, the server agent 160 assumes that the encoded bitmap has been properly processed and continues to stream protocol commands without awaiting the return of an acknowledgement message from the client agent 118. The server agent 160 does, however, track the number of protocol commands issued since the last acknowledgement read. The server agent 160 blocks further transmission of protocol commands if the number reaches a predefined threshold. The threshold enables the client agent 118 to establish an upper bound on the amount of memory needed to queue incoming protocol commands during recovery mode operation, as described in more detail below.

When a fuzzy key 419 is found in the fuzzy database 420, the server agent 160 sends a command to the client 110 directing the client agent 118 to copy the bitmap 422 associated with the fuzzy key 419 from the client's persistent storage 120 into the client's volatile memory 114 (step 550). This command is accompanied not only by the fuzzy key 419 which uniquely identifies the bitmap 422 of interest, but also by the associated index generated by the server agent 160 (as previously described) in order to identify the specific location within the client's volatile memory 114 that will receive and store the copied bitmap 422. By copying the bitmap 422 into volatile memory 114 rather than just maintaining its location in persistent storage 120, the invention can rapidly respond to several requests to draw the bitmap 422 that are received in quick succession or without much intervening cache activity by copying the bitmap 422 on the occurrence of the first request.

If the bitmap 422 is not currently stored in the persistent storage 120 despite the presence of the corresponding fuzzy key 419 in the fuzzy database 418, then the client agent 118 returns a message to the server agent 160 (in response to the "CACHE_READ_DISK_OBJECT" command previously issued by the server agent 160) indicating that the bitmap 422 is missing. Upon receiving this message, the server agent 160 retransmits the encoded bitmap data associated with the bitmap 422 to the client agent 118 (step 530). Note that the server agent 160 maintains a sequential list of all such CACHE_READ_DISK_OBJECT commands sent to the client agent 118 for which the server agent 160 has not yet received an acknowledgement so that the server agent 160 can properly associate a received acknowledgement with a particular bitmap 422 (so as to properly identify the encoded bitmap that needs to be transmitted).

Meanwhile, the client agent 118 enters a recovery mode in which the client agent 118 continues to read the incoming protocol stream, but does not process it. Instead, the client agent 118 builds a queue for receiving the stream of commands that continue to flow from the server 150 subsequent to the command that failed to find the bitmap 422 in persistent storage 120. The client agent 118 continues to store these commands in this queue, in FIFO (first in, first out) fashion, until the encoded bitmap is received and successfully decoded to produce the bitmap 422. To recognize the missing bitmap 422 in the incoming stream of commands, the client agent 118 looks for graphical data accompanying a recovery marker in the protocol stream. In one embodiment, the recovery marker is a particular pseudo-random number that is XORed with the unique key of the bitmap 422 (i.e., the 64-bit CRC and 32-bit length). The server agent 160 creates the recovery marker upon receiving a no-acknowledgement message from the client agent 118. When the bitmap 422 arrives, the client agent 118 stores it in its volatile memory 114 (step 560) (i.e., where the bitmap 422 would have been stored had the object been initially present in the persistent storage 120) and begins to process the commands in the queue. After processing all of the commands in the queue, the client agent 118 resumes processing the incoming stream of protocol commands coming from the server 150 over the network 140.

An advantage to the above-described recovery process is that it avoids the time delay penalty incurred by those cache systems that flush the commands in the pipeline upon the occurrence of a cache miss. Also, the recovery process causes no disruption to the stream of protocol commands nor any increase in the traffic on the channel by more than a few bytes beyond what the server 150 would have sent to the client 110 had the server agent 160 initially known that the bitmap 422 was not in the persistent storage 120.

In one embodiment, the present invention facilitates the location of the bitmap 422 in the client's persistent storage 120 by storing the bitmap 422 in a file whose file name is formed by encoding the fuzzy key 419 along with least-recently-used and/or least-frequently-used information associated with the bitmap 422. In this manner, the file name itself provides the information desired and thus avoids having to open and read the file. The encoding of the fuzzy key 419 as part of the bitmap's file name also enables the client agent 118 to rapidly extract the fuzzy key information from the file name and send it to the server agent 160 during an initial boot of the client 110 or at the start of the client/server session. The extracted fuzzy keys can be transmitted to the server 150 in an order that, for example, is based on the least-recently-used and/or least-frequently-used information that also forms a part of the file name.

In one embodiment, fuzzy keys 419 are added to and deleted from the fuzzy database 418 in one of three ways. First, at the start-up of the client agent 118 or upon establishing a client-server session with the server agent 160, the client agent 118 sends commands to the server agent 160 to add a fuzzy key 419 to the fuzzy database 418 for each appropriate bitmap 422 in the client's persistent storage 120 (the fuzzy keys accompany the client agent's commands). The client agent 118 can maintain a send list that specifies an order (e.g., based on most-recently-used or most-frequently-used information determined from prior client-server sessions) for sending fuzzy keys at startup to the server 150. The send list can be formed by the client agent 118 upon reading the directory of its persistent storage 120 and keeping a representation of the directory in volatile memory 114. In one aspect of the invention, the client agent 118 extracts fuzzy key information from the file name of the file, which contains the bitmap 422, when preparing the representation of the directory. Second, at predetermined polling intervals, the client agent 118 polls its persistent storage 120 to determine those bitmaps that are currently in its persistent storage 120 (e.g., by searching for file names containing a fuzzy key-like structure) and then sends add and/or delete commands to the server agent 160, as needed to update the server's fuzzy database 418. Third, when the server agent 160 sends a command to the client agent 118 to write a bitmap into the client's persistent storage 120, the server agent 160 generates and stores a corresponding fuzzy key 419 in the fuzzy database 418.

Transmission of bitmap data from the server 150 to the client 110 can take a relatively lengthy period of time, particularly when the network connection between the client and server is relatively slow. In one embodiment, the invention adapts the server's operation to changing network conditions by determining the relative speed of the network 140. For example, by dynamically assessing the bandwidth of the network 140, the server agent 160 can modify the encoding and compression techniques used to process bitmap data in order to reduce bandwidth requirements when transmitting over a slow network. The invention processes columns of bitmap data from left to right and primes the client cache 114 accordingly. As the encoded bitmap 414 is being transmitted, the transmission time can be monitored to determine the performance of the network 140. If the transmission time exceeds a threshold value, the client agent 118 can draw whatever bitmap data has already been stored in its cache 114 and display the remaining portions of the bitmap data either in real-time as it is received in the cache 114 or at predetermined intervals. In this manner, a user of the client will recognize that the client 110 is still operating on the bitmap data and be able to discern that the client 110 is not in a hung or failed/error condition. By approximating the effective network bandwidth to the client 110 and adapting the behavior of the server 150 accordingly, the server agent 160 can, for example, instruct the client agent 118 to use a whole bitmap versus using a whole column mode of display for a particular bitmap.

More particularly, the server agent 160 sends a Start_StopWatch command followed by encoded bitmap data 414 and a Stop_StopWatch command to the client agent 118. The client agent 118 responds to the Start_StopWatch command by reading the current time tick and writing it into a first array element. After the encoded bitmap 414 is received, the client agent 118 responds to the Stop_StopWatch command by reading the current time tick and writing it into a second array element. Comparing the difference in time ticks between the Start_StopWatch and Stop_StopWatch commands provides an estimate of the time that was expended to receive the encoded bitmap data. The resulting time difference is then transmitted back to the server agent 160. This procedure can be repeated to compute a smoothed, moving average from which a reasonable estimate of the effective throughput of encoded bitmap data can be determined. The invention uses the throughput estimate in view of the size of the encoded data for a particular bitmap to decide whether to use whole bitmap mode (e.g., if it is likely to take less than 5 seconds) or use progressive whole columns (e.g., if it is likely to take more than 5 seconds). Note that although this procedure does not result in a 100% accurate throughput estimate, it does provide sufficient granularity to detect fast or slow network connections from which different display modes can be determined. A similar technique can be used to time large screen-to-screen copies at the client end and to build up a similar moving average estimate of the client's performance during these operations, which can then be used to slow a producer thread on the server 150 and prevent an overrun at the source when the server 150 generates data faster than the client 110 can handle it.

In one embodiment, the invention forms objects that are sufficient in size to contain the data of a whole cache column. For example, the maximum object size and the size of the cache can be selected by the server agent 160 upon startup of the client/server session to be a function of the size of the connection window and its color depth, with larger sizes being allocated for the larger screens and depths. Further, current techniques for breaking up a bitmap into columns can result in columns of less than standard width at one or both ends of the bitmap. If these nonstandard columns are too narrow, then they may not be large enough to be retained in the client's persistent storage 120 and thus will not be present at the client 110 during subsequent client/server sessions. The invention avoids this problem by merging the narrow columns with neighboring columns so that only wide columns are used and thus all parts of a splash screen, for example, will be contained in the persistent storage 120. In one embodiment, whole columns are then displayed in two phases. The first phase primes the cache 114 with any missing data and the second phase draws the column from the cache 114, which may involve using more than one cached object. The column is therefore displayed on the display screen 128 in an atomic fashion. As previously discussed, when the network connection is slow, the columns can be displayed atomically, one-by-one, to reassure the user at the client 110 that the system is still working. Alternatively, the whole bitmap can be displayed atomically using a similar technique when a fast network connection is detected.

The moving average estimate technique discussed above can also be used to mitigate longstanding overscroll problems in an application that is being executed on a fast server and that is being displayed on a relatively slow client. The overscroll problem occurs, for example, when a user of the client 110 initiates a plurality of scroll commands such as by clicking on the scroll bar (or dragging the scrollbar) with a mouse 126 a number of times. As the scroll commands are sent to the fast server, the server 150 performs the scrolling operations and returns the associated data faster than the slow client 110 (or slow network 140) displays the results on its display screen 128. Consequently when the user at the client 110 eventually views the desired screen position and wants to stop the scrolling (by stopping the mouse clicks and/or scrollbar dragging), the display will continue to scroll beyond the desired screen position. This overscroll condition occurs because the fast server 150 has already processed the scroll commands and has transmitted the appropriate data back to the client 110, but the data has been queued at the slow client and has not yet been entirely processed.

The invention mitigates this overscroll problem by reducing its frequency of occurrence. More particularly, the invention periodically times selected scroll events at the server 150 (by scrolling the frame buffer) and at the client 110 (via the StopWatch commands discussed above) to compute a moving average estimate of their respective speeds. In this manner, the server agent 160 estimates how long a particular scroll event will take (speed times the number of pixels involved) to process at the server 150 and how long the client 110 is expected to take and if the expected processing time at the client 110 is larger than that of the server 150, the server processing is suspended by the appropriate time differential so as to keep the client 110 and server 150 substantially in step. This approach results in many fewer overscrolls due to the time lag between the client 110 and server 150 as compared to the number of overscrolls occurring when this approach is not implemented.

Figure 6:
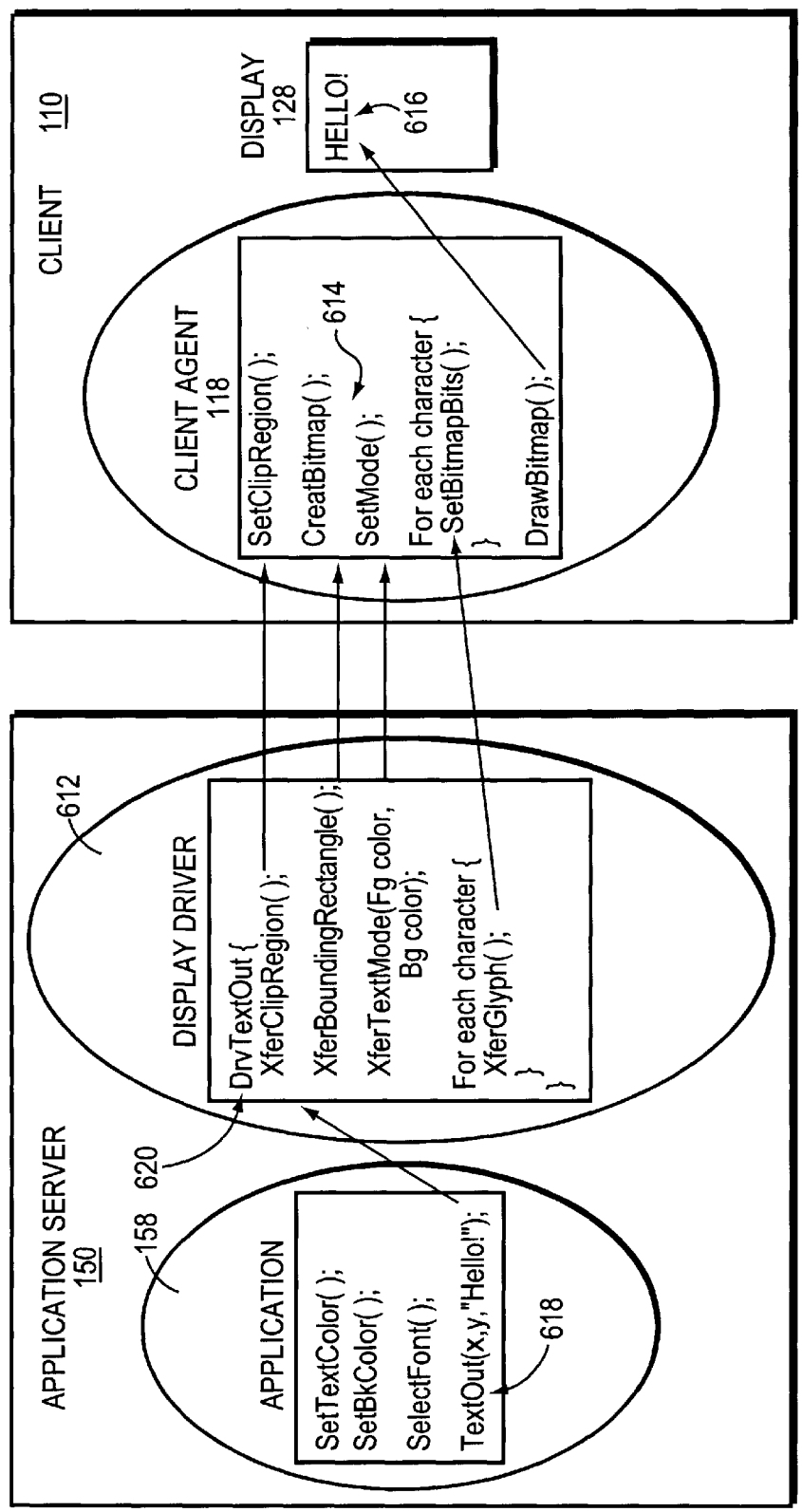
FIG. 6 schematically illustrates a set of procedures used to remote text information generated by an application program on a server to a display of a distant client in accordance with an embodiment of the present invention.

In addition to manipulating bitmap data, the present invention can also remote a text string that is generated on the server 150 to the display 128 of the distant client 110. With reference to FIG. 6, the server 150 executes the application program 158, which generates a text string that needs to be remoted to the client 110. The server agent 160 intercepts the commands sent from the application program 158 to the server operating system 156, which relate to the text string, and causes a display driver 612 of the server agent 160 to process the text-related information and to transmit a series of protocol commands 614 to the client agent 118 for displaying a text string 416 on the client's display 128. For example, the application 158 performs procedure calls that set the text color and the background color (here, "Hello!"). Execution of the TextOut procedure 618 by the application 158 triggers execution of the DrvTextOut procedure 620 of the display driver 612. As shown, the DrvTextOut procedure 620 defines the clip region, the bounding rectangle, and the text mode (including background and text color) by executing a sequence of corresponding procedures.

Execution of such procedures cause the display driver 612 to send the appropriate data and protocol commands (such as a subset of those provided in Table 1) to the client agent 118. The protocol commands are received and processed by the client agent 118, which executes procedures 614 that specify the clip region, the bounding rectangle, the text mode, and the glyph associated with each text character to be displayed. Note that the protocol associated with a glyph object encodes not only the glyph bitmap itself, but also its relative positioning information. The server 150 can also send other protocol commands to the client agent 118 that direct the client agent 118 to store the associated glyphs in volatile memory 114 and/or in the persistent storage 120, as previously described. The client agent 118 creates a bitmap corresponding to the size of the bounding rectangle that surrounds the text string and sets the relative positions of each glyph in its proper position within the bounding rectangle. Once the last glyph is received and its position set, the client agent 118 instructs the client operating system 116 to draw/render the bitmap on the display screen 128 of the client 110.

The present invention also supports several different descriptions of paths (a set of lines or curves used as part of the description of a line drawing operation or, in the case of a closed path, to describe a region) including ellipses, beziers, segments, strips, and styles. Segments refer to line segments that, when combined, form a path. Similarly, segments can be further parsed into strips, which are portions of the line segment (corresponding to a series of consecutive pixels) that exhibit the same angle characteristics. The encoding technique used to represent strips, for example, uses relative location information and quantized angles to characterize consecutive strips in particular line segments, which not only minimizes the amount of graphical line data that needs to be encoded but also results in a more repeatable sequence of data that can be more efficiently compressed. The increase in repeatability is particularly enhanced when representing strips that form a shape such as a rectangle or circle. The protocol used for strips also enables the client agent 118 to accurately reproduce a path independently and without knowledge of the algorithm used by the server agent 160 to convert the path into a sequence of pixels.

Figure 7A:
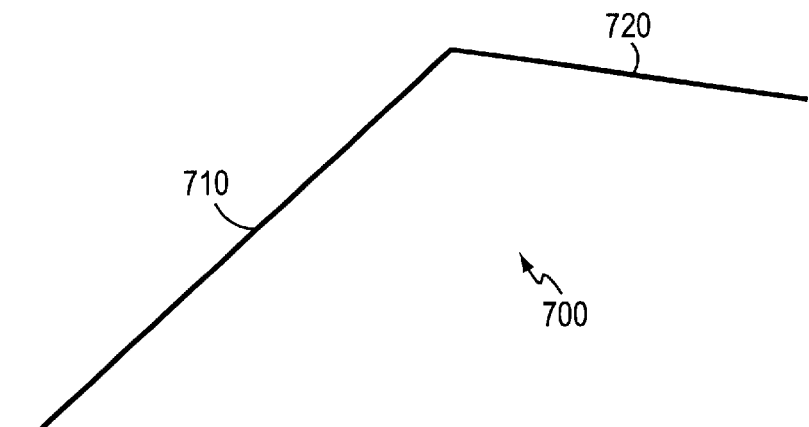
FIG. 7A provides a line diagram illustrating a plurality of segments forming a particular path.

With reference to the nonlimiting example in FIG. 7A, a path 700 comprises two line segments 710, 720, which appear to be perfectly linear. However, those skilled in the art recognize that line segments that are not perfectly horizontal, vertical, or at a 45 degree diagonal must be approximated by a corresponding series of strips when the path 700 is displayed on a display screen 128 (FIG. 1). This approximation is necessary, because the individual pixels on the display screen 128 are surrounded by, at most, eight other pixels that are either perfectly horizontal, vertical, or at a 45 degree diagonal relative to each other, and thus any line segments 710, 720 that are at a different overall angle, must be approximated by a series of strips. Accordingly and with reference to the exemplary path 700 of FIG. 7B, segment 710 is comprised of four strips 712, 714, 716, 718 where the individual pixels (depicted by square blocks) of each strip 712, 714, 716, 718 are organized at 45 degree diagonals relative to each other, and segment 720 is comprised of five strips 722, 724, 726, 728, 730 where the individual pixels of each strip 722, 724, 726, 728, 730 are organized horizontally relative to each other.

Figure 7B:
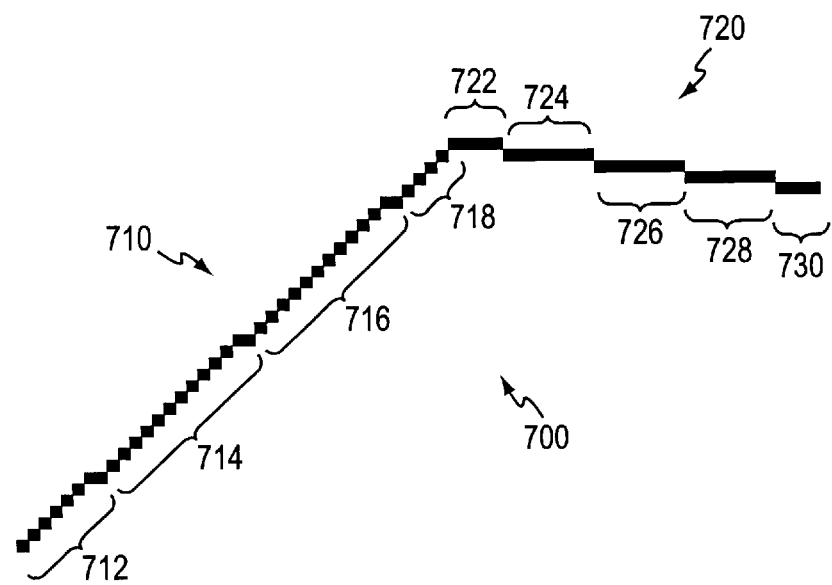
FIG. 7B provides a pixel-level representation of the line diagram of FIG. 7A, illustrating how the path is actually approximated on a computer display.
Figure 8A:
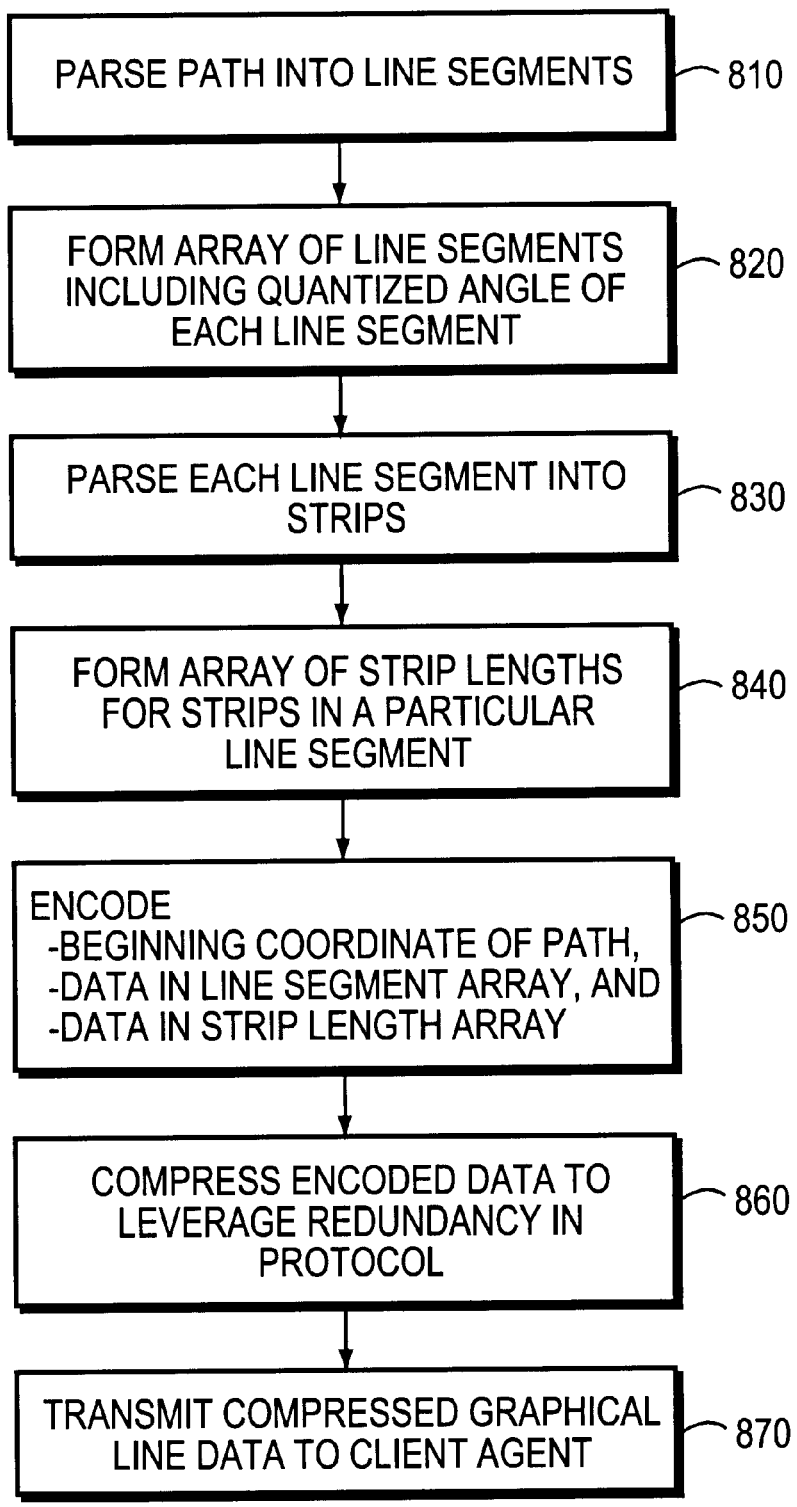
FIG. 8 provides a flow diagram of the steps taken when processing and encoding segment and strip data in accordance with an embodiment of the present invention.
FIG. 8B provides a coordinate system organized into a set of 16 regions that is used to quantize angle information relating to strips and which improves compression efficiency in accordance with an embodiment of the present invention.
Figure 8B:
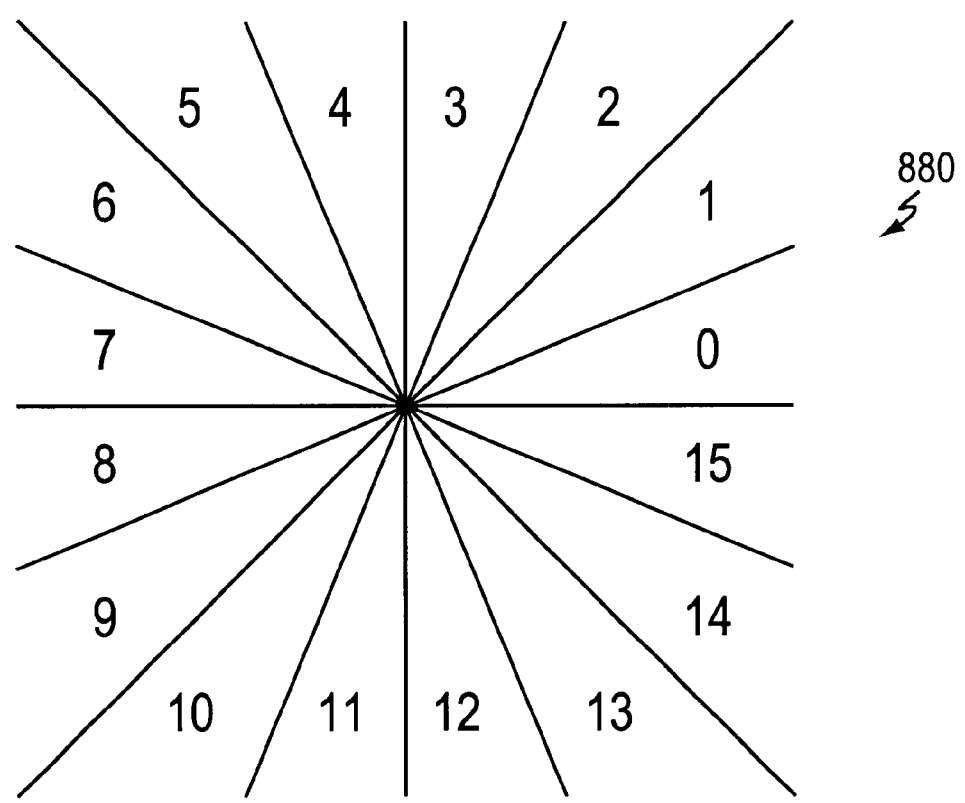

In one embodiment and with reference to FIGS. 7B and 8A, the server agent 160 parses the path 700 into line segments 710, 720, each having a particular length and angle (step 810). An array of line segments is then formed to store quantized segment information (hereinafter referred to as a quantized angle or "QA") for each line segment 710, 720 (step 820). With reference also to FIG. 8B, rather than computing the absolute angle associated with a particular segment 710, 720, the server agent 160 instead determines in which of the sixteen quantized angles 880 the absolute angle lies. This quantization technique determines in which sixteenth of the circumference the end point lies for a line segment starting at the center of a circle (a radius). This information can be expressed as the unsigned delta from the last segment specified in this context (mod 16, initialized to 0). This technique results in a more repeatable sequence (than if the absolute angle was used), particularly when the segments form a shape such as a rectangle or a circle.

The server agent 160 then parses each line segment 710, 720 into strips (712, 714, 716, 718; 722, 724, 726, 728, 730 respectively) (step 830). The length of each strip of a particular segment 710, 720 is subsequently stored in a strip length array for further processing (step 840). In one embodiment, the Windows NT algorithm, bLine, is used to break up the path 700 into an array of strips. The NT algorithm determines the quantized angle of each strip and segment so that there is no ambiguity associated with segments or strips that lie on a boundary between quantized angle regions. The NT algorithm vertically flips a line going up so that the line is always going down (the y value keeps increasing) and sets the flag, FL__FLIP__V. Similarly, a line going to the left is flipped horizontally so that it always goes to the right (the x value keeps increasing) and sets the flag, FL__FLIP__H. As a result, the array of strips output by this algorithm fall into a single quadrant. In this particular embodiment, the server agent 160 undoes the flipping operation of the NT algorithm so that the array of strips are flipped back to their previous/original quantized angles to ensure that the endpoint of a previous strip and the starting point of the next consecutive strip coincide so as to avoid having to send the starting coordinate of the next consecutive strip.

The server agent 160 then encodes the beginning coordinate of the path 700 together with the quantized angle data in the line segment array and pixel length data in the strip length array to form a protocol stream (step 850). The encoded data is then subjected to a compression algorithm to take advantage of the data redundancies in the protocol stream (step 860) and the compressed graphical line data is subsequently transmitted to the client agent 118 for decoding and further processing (step 870).

Figure 9:
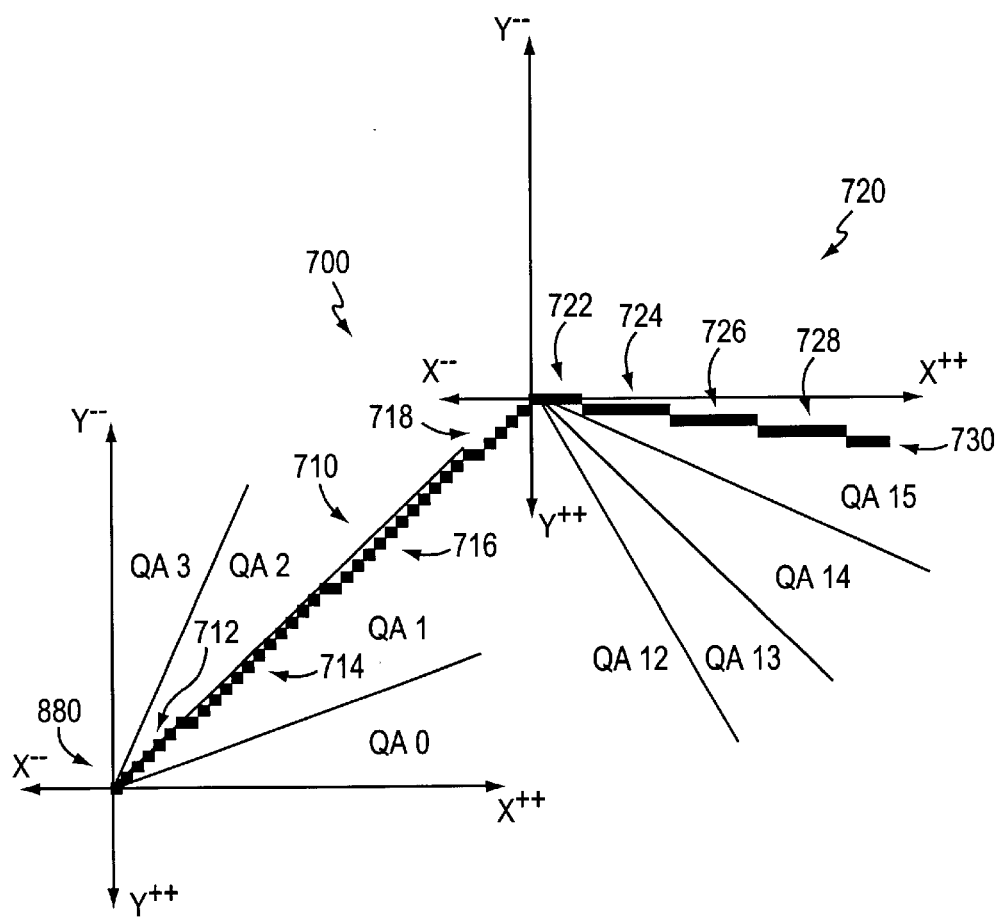
FIG. 9 superimposes the coordinate system of FIG. 8B on the pixel-level representation of FIG. 7B to illustrate an embodiment of a strip processing technique in accordance with the present invention.

With reference to the exemplary illustration in FIG. 9 and the quantized angle information of FIG. 10, the line segment 710 comprises four strips 712, 714, 716, 718 positioned within quantized angle 1. The beginning coordinate of the path 700, which is transmitted from the server agent 160 to the client agent 118 as part of the compressed graphical line data, corresponds to the first pixel in strip 712 (positioned at the origin of 880). The graphical line data further includes the pixel length of each strip 712, 714, 716, 718 in the segment 710. Since the segment 710 does not correspond to a perfectly horizontal, vertical, or 45 degree diagonal, each consecutive strip 714, 716, and 718 in segment 710 is adjusted by a particular delta value as indicated in FIG. 10 in order to properly approximate the overall angle of the segment 710. In the present example, in order to get from the last point in the previous strip 712 to the beginning point in the next consecutive strip 714, the client agent 118 displays strip 714 at substantially the same x value and at an increasing y value. This process is repeated for each strip in the segment 710 as well as for the strips in segment 720, which are positioned within QA 15.

Accordingly and in one embodiment, the protocol stream generated by the present invention when processing strips comprises the starting position of the path, an index (if any) corresponding to a location in the client's volatile memory 114 (FIG. 1) which may already store a particular strip transmitted some time earlier in the client-server session, the number of segments in the path, the quantized angle of each segment (from which the delta values reflected in FIG. 10 are determined), the length of each strip together with some control information, and quantized angle delta information that is added to the quantized angle of a first or prior segment in order to inform the client agent 118 of the quantized angle of subsequent segments. In this manner, the invention avoids having to send coordinate and absolute angle information for each strip in the path. Further, the strip processing technique discussed above facilitates the efficient compression of graphical line data by leveraging the repetitiveness of the data in the uncompressed protocol stream.

The present invention can also be applied to bitmaps that are displayed in an on-screen surface, as well as to bitmaps in an off-screen surface (e.g., that are stored in a video display adapter's memory and/or in a pre-allocated section of the client's volatile memory 114 that will be operated on by a graphics conversion library). Off-screen surfaces are frequently formed by applications, such as Microsoft Word, that write bitmaps to the off-screen surface until the surface is complete, at which time the off-screen surface is displayed on the display screen 128 of the client 110 in final form as an on-screen surface. Therefore, off-screen surfaces frequently provide the source for on-screen surfaces.

In one embodiment and with respect to off-screen surfaces, the client agent 118 informs the server agent 160 as to the amount of local volatile memory 114 available for off-screen surfaces so that the server agent 160 does not form an off-screen surface larger than the client's available memory. The server agent 160 subsequently forms an off-screen surface and transmits it to the client agent 118 with instructions to store the surface in its volatile memory 114. The client agent 118 selects and allocates a particular section of its volatile memory 114 to the surface and stores the surface therein. Each off-screen surface has a set of associated attributes, such as an identifier that uniquely identifies the surface, pixel format, dimensions, drawing attributes, protocol state, etc.

In one embodiment, in order to efficiently use the client's volatile memory 114, the server agent 160 can issue commands to the client agent 118, directing that certain operations be performed to the off-screen surface only when the off-screen surface interacts with the on-screen surface (e.g., when updating the on-screen surface with bitmap data from the off-screen surface). If the only interaction between the on-screen surface and the off-screen surface is a final copy to the screen, then the operations can be targeted to the on-screen surface and thus reduce the amount of bitmap data that must be transmitted over the network 140. Alternatively, the source of the on-screen surface can be restricted to either correspond to an off-screen surface stored remotely at the server 150 or to an off-screen surface stored locally at the client 110. Typical operations to the off-screen surface that are requested by the server agent 160 include updating the bitmap in the off-screen surface with updated text, line, or other data.

Figure 11:
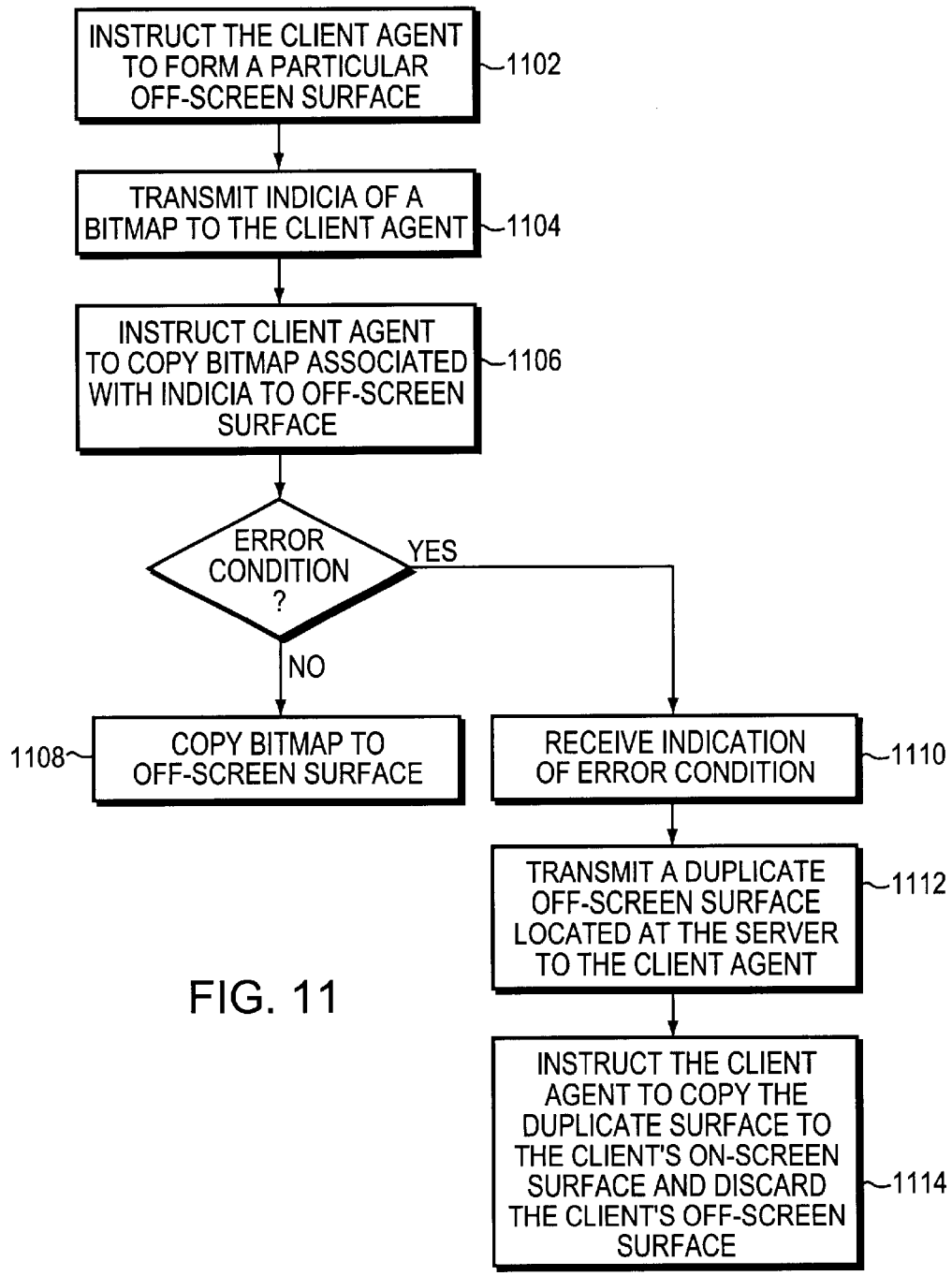
FIG. 11 provides a flow diagram of the steps performed by the server agent in response to an error condition involving the formation of a client's off-screen surface.

In one embodiment and with reference to FIG. 11, the server agent 160 intercepts calls made to the server operating system 156, which relate to the creation of an off-screen surface, and the server agent 160 forms a duplicate copy of the surface and stores it, along with its attributes, in the server's local memory. The server agent 160 then issues a command to the client agent 118 to form the off-screen surface in the client's volatile memory 114 (step 1102). The command is accompanied by an encoded representation of the off-screen surface if this is the first instance of the off-screen surface or by an index or fuzzy key if the off-screen surface has been previously transmitted during the client-server session (step 1104). The server agent 160 instructs the client agent 118 to incorporate the graphical data identified by the index/fuzzy key indicia or encoded surface into the client's off-screen surface (step 1106). The client agent 118 responds to the server agent's instructions by copying the identified surface/bitmap to the client's off-screen surface (step 1108). If a BITBLT command issued by the server agent 160 fails, for example, to form a bitmap in the client's off-screen surface, such as when a memory allocation error occurs, the client agent 118 sends a C2S_OSS_Error command to the server agent 160 indicating the failed condition (step 1110). In response to the error condition, the server agent 160 uses its local copy of the off-screen surface as the source for updating the client's off-screen surface. The client agent 118 uses the information received from the server's local copy to update the off-screen surface on the client 110 and to correct any corrupted/dirty regions of the off-screen surface. Alternatively, when an error condition is encountered, the server agent 160 transmits its local/duplicate copy of the off-screen surface (step 1112) to the client agent 118 and instructs the client agent 118 to use the duplicate surface as the source for updating the client's on-screen surface and to discard the corrupted off-screen surface at the client (step 1114).

Although the present invention has been described with reference to specific details, it is not intended that such details should be regarded as limitations upon the scope of the invention, except as and to the extent that they are included in the accompanying claims.

What is claimed is:

1. A method of efficiently reducing the amount of repetitive graphical data transmitted to a remote display device, the method comprising the steps of:
   searching for an index associated with the graphical data, the index being indicative of a prior transmission of the graphical data;
   upon failing to locate the index, searching a fuzzy database for a fuzzy key associated with the graphical data, the fuzzy key being indicative of a likelihood that the graphical data is stored within a persistent storage memory coupled to the remote display device; and
   upon locating the fuzzy key, transmitting the fuzzy key to an agent associated with the persistent storage memory and remote display device.

2. The method of claim 1 wherein the graphical data corresponds to an encoded bitmap.

3. The method of claim 1 wherein the graphical data corresponds to a glyph.

4. The method of claim 1 wherein the graphical data corresponds to a strip.

5. The method of claim 1 wherein the graphical data corresponds to an off-screen surface.

6. The method of claim 1 wherein the index is indicative of a memory location in a cache coupled to the remote display device, the agent having previously stored the prior transmission of the graphical data at the memory location.

7. The method of claim 6 wherein the size of the graphical data is no greater than a maximum cache object size.

8. The method of claim 1 wherein the fuzzy key corresponds to a length of the graphical data.

9. The method of claim 1 further comprising the step of:
   receiving a plurality of fuzzy keys from the agent in response to initiating a session with the agent.

10. The method of claim 1 further comprising the step of:
    periodically receiving a plurality of fuzzy keys from the agent in response to a predetermined interval.

11. The method of claim 1 further comprising the step of:
    upon locating the index, transmitting the index to the agent.

12. The method of claim 1 further comprising the steps of:
    upon failing to locate the fuzzy key, forming the fuzzy key;
    storing the fuzzy key in the fuzzy database;
    transmitting the graphical data to the agent; and
    instructing the agent to store the graphical data in a volatile memory coupled to the agent.

13. The method of claim 12 further comprising the step of:
    storing the graphical data in a file residing in the persistent storage memory, the file having a file name corresponding to the fuzzy key.

14. The method of claim 1 further comprising the step of:
    instructing the agent to copy the graphical data from the persistent storage memory to a cache coupled to the agent and the remote display device.

15. The method of claim 14 further comprising the step of:
    upon the agent failing to copy the graphical data, transmitting the graphical data and a recovery marker to the agent.

16. The method of claim 1 further comprising the steps of:
    queuing a command associated with the graphical data together with a plurality of other commands in a queue;
    determining whether the queued command associated with the graphical data supersedes at least one of the plurality of other queued commands; and
    upon determining that the queued command associated with the graphical data supersedes the at least one of the plurality of other queued commands, removing the at least one of the plurality of other queued commands from the queue.

17. The method of claim 16 wherein the queued command associated with the graphical data is placed in the queue after the at least one of the plurality of other queued commands is placed in the queue.

18. The method of claim 1 further comprising the steps of:
    upon failing to locate the graphical data associated with the transmitted fuzzy key, the agent
      storing a command associated with the graphical data together with a plurality of later-received commands in a queue coupled to the agent;
    receiving the graphical data; and
    processing the command associated with the graphical data and at least some of the plurality of later-received commands stored in the queue.

19. A method of reducing the amount of data transmitted from a server to a client via a communications network, the method being performed at the client and comprising the steps of:
    receiving a protocol stream, the protocol stream including an indicia of graphical data, a command associated with the graphical data, and a plurality of other commands;
    searching for the graphical data using the indicia;
    upon failing to locate the graphical data, storing the command associated with the graphical data together with the plurality of other commands in a queue;
    receiving the graphical data;
    processing the received graphical data using the associated command; and
    processing at least some of the plurality of other commands in the queue.

20. A system for efficiently reducing the amount of repetitive graphical data transmitted to a remote display device, the system comprising:
- an index associated with the graphical data, the index being indicative of a prior transmission of the graphical data;
- a fuzzy database; and
- a fuzzy key stored within the fuzzy database, the fuzzy key being associated with the graphical data and being indicative of a likelihood that the graphical data is stored within a persistent storage memory coupled to the remote display device, wherein the fuzzy database is searched for the fuzzy key upon failing to locate the index.

21. The system of claim 20 wherein the graphical data corresponds to an encoded bitmap.

22. The system of claim 20 wherein the graphical data corresponds to a glyph.

23. The system of claim 20 wherein the graphical data corresponds to a strip.

24. The system of claim 20 wherein the graphical data corresponds to an off-screen surface.

25. The system of claim 20 wherein the index is indicative of a memory location in a cache coupled to the remote display device.

26. The system of claim 20 wherein the size of the graphical data is not greater than a maximum cache object size.

27. The system of claim 20 wherein the fuzzy key corresponds to a length of the graphical data.

28. The system of claim 20 further comprising a file residing in the persistent storage memory, the file having a file name corresponding to the fuzzy key.

29. The system of claim 20 further comprising:
- a protocol stream, the protocol stream including the fuzzy key, a command associated with the graphical data, and a plurality of other commands; and
- a queue, the queue storing the command associated with the graphical data together with the plurality of other commands in response to a failure to locate the graphical data using the fuzzy key, wherein the associated command and at least some of the plurality of other commands are processed upon receiving the graphical data.

30. A system for reducing the amount of data transmitted from a server to a client via a communications network, the system comprising:
- a client agent operating on the client and coupled to the server via the communications network, wherein the client agent
  a) receives a protocol stream, the protocol stream including an indicia of graphical data, a command associated with the graphical data, and a plurality of other commands;
  b) searches for the graphical data using the indicia;
  c) upon failing to locate the graphical data, stores the command associated with the graphical data together with the plurality of other commands in a queue;
  d) receives the graphical data;
  e) processes the received graphical data using the associated command; and
  f) processes at least some of the plurality of other commands in the queue.

* * * * *

UNITED STATES PATENT AND TRADEMARK OFFICE
CERTIFICATE OF CORRECTION

PATENT NO.        : 7,028,025 B2
APPLICATION NO. : 09/866531
DATED             : April 11, 2006
INVENTOR(S)      : Collins It is certified that error appears in the above-identified patent and that said Letters Patent is hereby corrected as shown below:

On Title page (item 56)
References Cited
U.S. PATENT DOCUMENTS

| | | | |
|---|---|---|---|
| Re.32,632 | 03/1988 | Atkinson | 340/709 |
| 4,860,247 | 08/1989 | Uchida et al. | 364/900 |
| 4,903,218 | 02/1990 | Longo et al. | 365/521 |
| 4,937,036 | 06/1990 | Beard et al. | 340/706 |
| 4,949,281 | 08/1990 | Hillenbrand et al. | 364/518 |
| 4,958,303 | 09/1990 | Assarpour et al. | 364/521 |
| 5,072,412 | 12/1991 | Henderson, Jr. et al. | 395/159 |
| 5,103,303 | 04/1992 | Shoji et al. | 358/75 |
| 5,231,697 | 07/1993 | Yamada | 395/142 |
| 5,309,555 | 05/1994 | Akins et al. | 395/157 |
| 5,351,129 | 09/1994 | Lai | 348/584 |
| 5,414,457 | 05/1995 | Kadowaki et al. | 348/14 |
| 5,469,540 | 11/1995 | Powers, III et al. | 395/158 |
| 5,579,469 | 11/1996 | Pike | 395/326 |
| 5,757,925 | 05/1998 | Faybishenko | 380/49 |
| 5,767,849 | 06/1998 | Borgendale et al. | 345/335 |
| 5,874,960 | 02/1999 | Mairs et al. | 345/340 |
| 5,877,757 | 03/1999 | Baldwin et al. | 345/336 |
| 5,944,791 | 08/1999 | Scherpbier | 709/218 |
| 5,949,975 | 09/1999 | Batty et al. | 395/200.43 |
| 5,999,179 | 12/1999 | Kekic et al. | 345/349 |
| 5,999,950 | 12/1999 | Krueger et al. | 707/535 |
| 6,034,689 | 03/2000 | White et al. | 345/357 |
| 6,161,126 | 12/2000 | White et al. | 709/203 |

UNITED STATES PATENT AND TRADEMARK OFFICE
CERTIFICATE OF CORRECTION

PATENT NO. : 7,028,025 B2 Page 2 of 2
APPLICATION NO. : 09/866531
DATED : April 11, 2006
INVENTOR(S) : Collins It is certified that error appears in the above-identified patent and that said Letters Patent is hereby corrected as shown below:

5,682,488    10/1997    Gleason et al.    395/348

Signed and Sealed this

Eighth Day of August, 2006

JON W. DUDAS
*Director of the United States Patent and Trademark Office*